US012477045B1

(12) United States Patent
Johnson

(10) Patent No.: US 12,477,045 B1
(45) Date of Patent: Nov. 18, 2025

(54) DATA BROKER AND CLIENT

(71) Applicant: HiveMQ GmbH, Landshut (DE)

(72) Inventor: Simon Johnson, Bournemouth (GB)

(73) Assignee: HiveMQ GmbH, Landshut (DE)

( * ) Notice: Subject to any disclaimer, the term of this patent is extended or adjusted under 35 U.S.C. 154(b) by 0 days.

(21) Appl. No.: 18/999,168

(22) Filed: Dec. 23, 2024

(30) Foreign Application Priority Data

Jun. 26, 2024 (GB) .................................... 2409207

(51) Int. Cl.
*G06F 15/16* (2006.01)
*H04L 67/12* (2022.01)
*H04L 67/55* (2022.01)
*H04W 52/02* (2009.01)

(52) U.S. Cl.
CPC ............. *H04L 67/55* (2022.05); *H04L 67/12* (2013.01); *H04W 52/0235* (2013.01)

(58) Field of Classification Search
CPC ..... H04L 67/55; H04L 67/12; H04W 52/0235
See application file for complete search history.

(56) References Cited

U.S. PATENT DOCUMENTS

2009/0172117 A1* 7/2009 Bedi ................ H04W 52/0216
709/206
2012/0263084 A1* 10/2012 Liu .................. H04W 52/0216
370/311
2018/0176864 A1* 6/2018 Vasishtha ............... H04W 4/80
2021/0350691 A1* 11/2021 Shah ..................... G08B 17/005

OTHER PUBLICATIONS

What is eDRX (Extended Discontinuous Reception)?, Sierra Wireless, Jul. 28, 2022.
Understanding LTE-M Power Management Modes, Aeris Communications, May 23, 2024.
Power Saving Mode (PSM) in Ues (MME Administration Guide, StarOS Release 21.1), Cisco, 2022.
Andrew Banks et al: MQTT for Sensor Network (MQTT-SN) Version 2.0 Committee Specification Draft 01, Dec. 7, 2023.

* cited by examiner

*Primary Examiner* — Normin Abedin
(74) *Attorney, Agent, or Firm* — EIP US LLP

(57) ABSTRACT

A method comprises transmitting by a client device in a publish/subscribe messaging system, in accordance with a publish/subscribe messaging protocol, a subscribe request to a data broker, and transmitting, by the client device to the data broker, a sleep indication, the sleep indication indicating that a messaging client of the client device is entering a sleep state until a sleep state end time and requesting that, while the messaging client is in the sleep state, the data broker is to refrain from sending data to the client device. The method further comprises transmitting, by a network interface of the client device via a wireless communications link, a low power mode request signal for requesting to operate the network interface in a low power mode until a low power mode end time, wherein the sleep state end time and the low power mode end time are substantially aligned.

12 Claims, 9 Drawing Sheets

DATA BROKER AND CLIENT

CROSS-REFERENCE TO RELATED APPLICATIONS

This application claims priority to GB Application No. GB 2409207.4, filed Jun. 26, 2024, under 35 U.S.C. § 119(a). Each of the above-referenced patent applications is incorporated by reference in its entirety.

TECHNICAL FIELD

The present invention relates to a data broker and client in a publish/subscribe messaging system.

BACKGROUND

In order to coordinate the communication of data between numerous data sources and entities which make use of that data, a data broker may act as an intermediary in a publish/subscribe architecture by maintaining a record of subscriber clients who wish to receive data transmitted by publisher clients. The data may be, for example, sensor data generated at a remote device. The use of a data broker can produce a faster and more efficient communication system, by eliminating the need for direct communication between the publisher and subscriber clients.

A client device may receive data from a broker, transmit to a broker, or both. The transmission of data or other control packets to or from a client may be by means of a wireless communications link. The wireless communications link may be operated in accordance with a particular standard or specification, such as those developed by the third generation partnership project (3GPP).

SUMMARY

According to a first aspect of the present invention, there is provided a method comprising transmitting by a client device in a publish/subscribe messaging system, in accordance with a publish/subscribe messaging protocol, a subscribe request to a data broker requesting the data broker to transmit data to the client device. The method further comprises transmitting, by the client device to the data broker, a sleep indication, the sleep indication indicating that a messaging client of the client device is entering a sleep state until a sleep state end time and requesting that, while the messaging client is in the sleep state, the data broker is to refrain from sending the data to the client device, and transmitting, by a network interface of the client device via a wireless communications link, a low power mode request signal for requesting to operate the network interface in a low power mode until a low power mode end time, wherein the sleep state end time and the low power mode end time are substantially aligned.

According to a second aspect of the present invention, there is provided a method at a data broker of a publish/subscribe messaging system, the method comprising receiving from a messaging client in the publish/subscribe messaging system, in accordance with a publish/subscribe messaging protocol, a subscribe request requesting the data broker to transmit data to the messaging client. The method further comprises determining that data within the scope of the subscribe request is to be transmitted to the messaging client and that the messaging client is in a sleep state in which, according to the publish/subscribe messaging protocol, the data broker is to refrain from transmitting data to the messaging client, transmitting a wake up indication or a wake up control request, determining that the messaging client is in an awake state in which, according to the publish/subscribe messaging protocol, the messaging client is configured to receive data from the data broker, and transmitting the data to the messaging client.

Other aspects are set out in the claims.

Further features and advantages of the invention will become apparent from the following description of preferred embodiments of the invention, given by way of example only, which is made with reference to the accompanying drawings.

DETAILED DESCRIPTION

Figure 1:
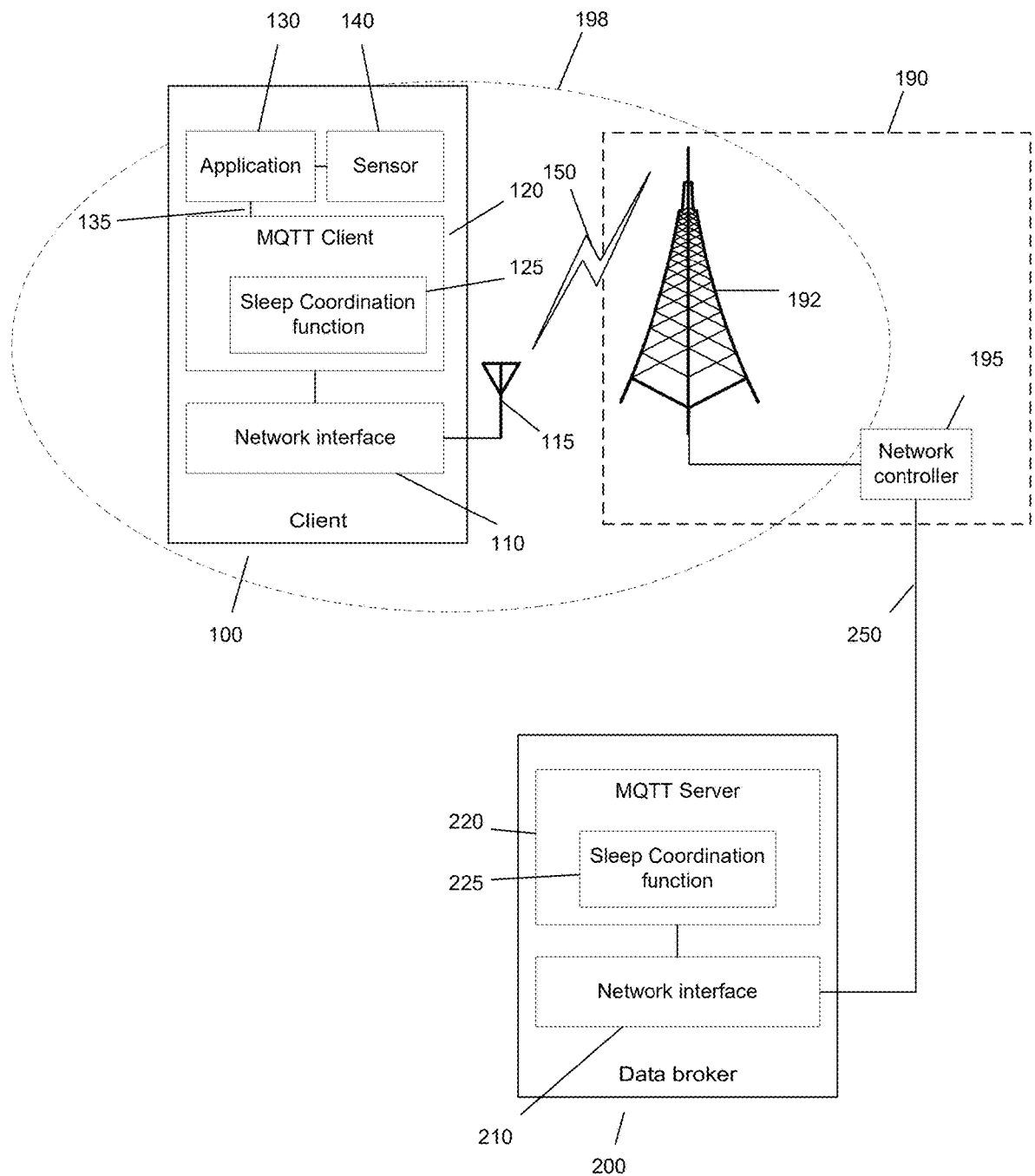
FIG. 1 schematically shows the main components of a system in accordance with examples of the present disclosure.

FIG. 1 is a block diagram of a system in accordance with examples of the present disclosure. FIG. 1 shows a client device 100 communicating with a data broker 200 via a wireless communications network 190. The client device 100 comprises a network interface 110 which is coupled to an antenna 115. The client device 100 also comprises an MQTT client 120 which includes a sleep coordination function 125.

The network interface 110 provides an interface to the MQTT client 120. The network interface 110 receives from the MQTT client 120 packets for transmission via the wireless communications network 190, and forwards to the MQTT client 120 packets received from the wireless communications network 190. In the example of FIG. 1, the network interface 110 receives control indications from the MQTT client 120 and sends notifications to the MQTT client 120, as described further below.

The MQTT client 120 receives and transmits packets via the network interface 110, in accordance with a publish/subscribe messaging protocol, to and from an MQTT server 220 provided at the data broker 200. The client device 100 also comprises an application 130 which communicates with the MQTT client 120 via an API 135. The application 130 provides, via this API 135, data to the MQTT client 120 for publication towards the data broker 200 and receives, via the API 135, data published by the data broker 200, which may be published by the data broker 200 to the MQTT client 120 in accordance with a subscription of the MQTT client 120. Data which is published by the client device 100 is obtained from a sensor 140 within the client device 100. In examples of the present disclosure, the sleep coordination function 125 may coordinate a sleep state at the MQTT client and a low power mode at the network interface 110.

The wireless communications network 190 comprises a network controller 195 which is coupled to a radio access network 192. The radio access network 192 transmits and receives wireless signals within a cell 198.

The client device 100 communicates with the data broker 200 via the wireless communications network 190. More specifically, the network interface 110 of the client device 100 communicates via a wireless communications link 150 with the radio access network 192 of the wireless communications network 190. The wireless communications network 190 may be a cellular communications network and may operate in accordance with one or more cellular communications standards, such as those developed by 3GPP. The wireless communications network 190 may be a wireless local area network (WLAN) and may operate in accordance with one or more WLAN standards, such as one or more of the IEEE 802.11 family of standards. Accordingly, the wireless communications link 150 may be operated in accordance with a wireless communications standard, such as a 3GPP narrow band internet of things (NB-IoT) standard, a 3GPP long term evolution-machine type communication (LTE-M) standard, or a 3GPP 5G/NR standard, or an IEEE 802.11 standard, or any other suitable standard, including one which is developed in the future.

The data broker 200 communicates with the wireless communications network 190 via communications link 250. It will be understood that although this is represented for simplicity as a single link in the example of FIG. 1, this may comprise one or more wired communications links and/or one or more wireless communication links. The communications link 250 may comprise the Internet. The MQTT server 220 of the data broker 200 comprises a sleep coordination function 225 which monitors the sleep state of the MQTT client 120 of the client device 100 and may trigger the transmission of a wake up indication by the network interface 210 of the data broker 200.

The MQTT client 120 and MQTT server 220 communicate with each other in accordance with an MQTT publish/subscribe protocol. In some examples this is an MQTT sensor networks (MQTT-SN) protocol, and accordingly, references to an MQTT client, MQTT server may refer to an MQTT-SN client and an MQTT-SN server, respectively. References to MQTT herein may according refer to MQTT-SN.

Figure 2:
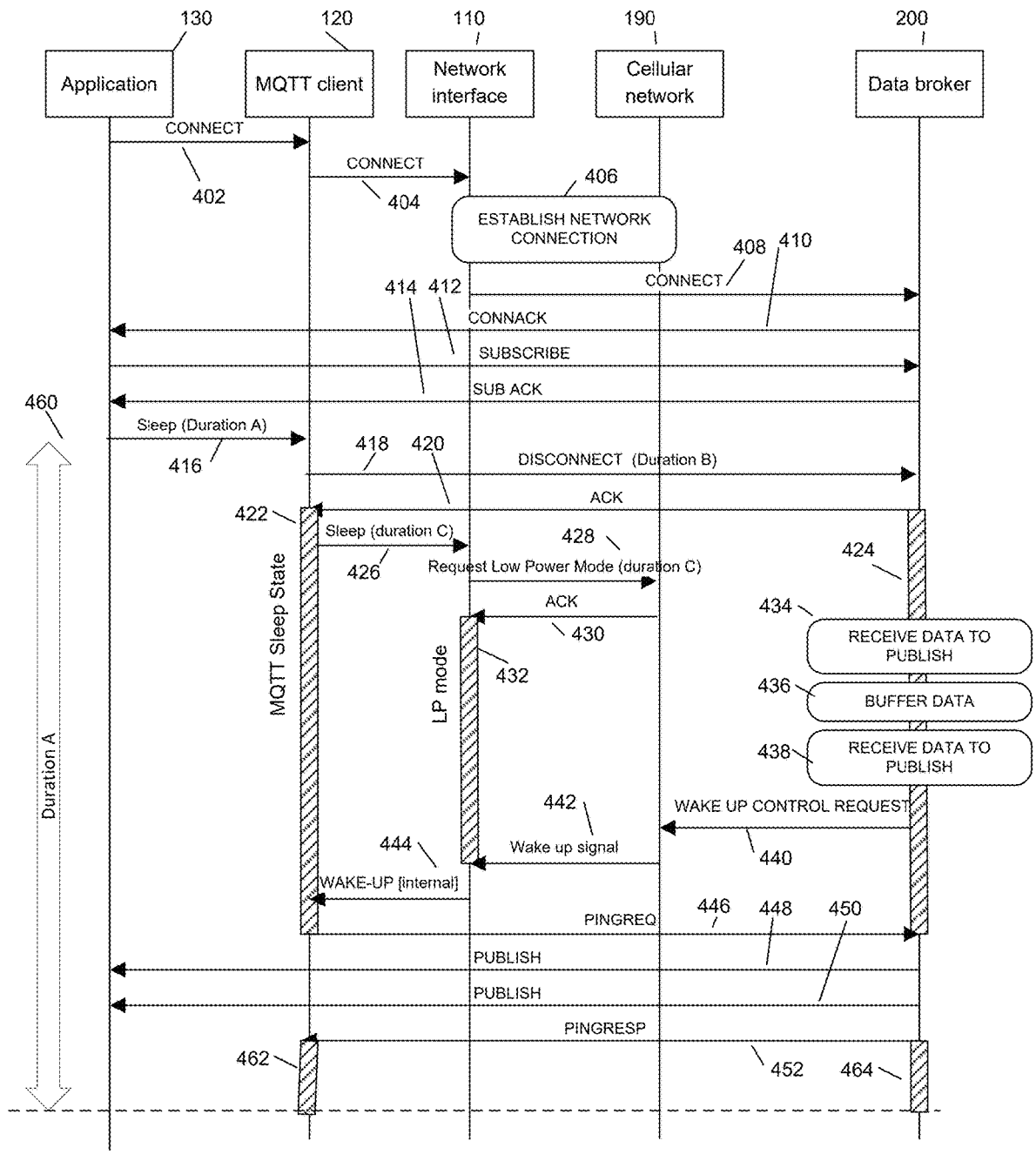
FIG. 2 is a sequence diagram showing an example of messages and packets communicated between components of the system of FIG. 1 in accordance with examples of the present disclosure.

FIG. 2 is a sequence diagram showing an example of messages and packets transmitted in accordance with examples of the present disclosure.

Initially, the client device 100 is not connected with the data broker 200. In particular, no MQTT connection exists between the MQTT client 120 of the client device 100 and the MQTT server 220 of the data broker 200. Similarly, no network connection exists between the network interface 110 of the client device 100 and the wireless communications network 190.

In the example of FIG. 2, the application 130 sends a CONNECT request 402 via the API 135 to the MQTT client 120. The MQTT client 120 forms an MQTT CONNECT control packet 404 which is passed to the network interface 110 for transmission to the data broker 200. In response to receiving the CONNECT control packet 404, the network interface 110 establishes at step 406 a network connection with the wireless communications network 190. In particular, the wireless communications link 150 is established for allowing the transmission of, for example, control packets between the client device 100 and the wireless communications network 190. Subsequently, the CONNECT control packet 408 is transmitted, via the wireless communications network 190, to the data broker 200.

The CONNECT request 402, CONNECT control packet 404 transferred to the network interface 110, and CONNECT control packet 408 transmitted to the data broker 200 are shown separately in FIG. 2. In the example of FIG. 2, the API 135 provided by the MQTT client 120 permits the application 130 to directly request or trigger the transmission of particular MQTT control packets, and to receive indications that correspond to the receipt of certain MQTT control packets. Similarly, the interface provided by the network interface 110 to the MQTT client 120 permits the MQTT client 120 to request or trigger the transmission of the MQTT control packets and to receive MQTT control packets. Accordingly, in the interests of conciseness and clarity, subsequent requests from, or indications to the application 130 which are associated with corresponding MQTT control packets are not shown separately in FIG. 2 and are shown combined with respective requests and indications to and from the network interface 110.

It will be appreciated that in some examples, the API 135 provided by the MQTT client 120 may use requests and indications which do not correspond to particular MQTT control packets. In some examples, there may be no API 135. The application 130 and MQTT client 120 may operate jointly, for example as a single function. In some examples, the application 130 may operate on separate devices which are communicatively coupled to each other.

For conciseness, internal signalling within the data broker 200 (such as between the MQTT server 220 and the data broker's network interface 210) is not shown in FIG. 2, and references to transmission or reception by the data broker 200 may accordingly comprise the transmission or reception of messages or indications between the data broker's network interface 210 and the MQTT server 220 as well as the transmission from or reception by the network interface 210. In general, references herein to a step performed by the data broker 200 may refer to one or more steps performed by one or more of the MQTT server 220, the sleep coordination function 225 of the MQTT server 220 and the network interface 210. For example, in the example of FIG. 2, the CONNECT control packet 408 is received at the network interface 210 of the data broker 200 and passed to the MQTT server 220. In response to receiving the CONNECT control packet 408, the MQTT server 220 generates the CONNACK control packet 410, and the transmission of the CONNACK control packet 410 by the data broker 200 comprises the transfer of the CONNACK control packet 410 from the MQTT server 220 to the network interface 210, and the subsequent transmission of the CONNACK control packet 410 by the network interface 210.

In response to receiving the CONNECT control packet 408, the data broker 200 transmits a CONNACK control packet 410 to the client device 100 to confirm the establishment of an MQTT connection. Specifically, at the data broker 200, the MQTT server 220 may receive, via the network interface 210, the CONNECT control packet 408 and may, in response, generate and transmit, via the network interface 210, the CONNACK control packet 410.

The CONNACK control packet 410 is processed at the MQTT client 120 and a corresponding CONNACK indication (not shown separately) is passed from the MQTT client 120 to the application 130 to indicate that the MQTT connection has been established with the data broker 200.

Following the receipt of the CONNACK control packet 410, the client device 100 has now both an established wireless communications link 150 and, via that wireless communications link 150, an established and active MQTT connection (which may be an MQTT-SN connection) with the data broker 200.

Subsequently, the application 130 indicates to the MQTT client 120, by means of a SUBSCRIBE indication, that the application 130 wishes to receive certain data from the data broker 200. This indication, and the corresponding SUBSCRIBE control packet generated by the MQTT client 120 are indicated by arrow 412 in FIG. 2. The SUBSCRIBE indication/control packet 412 may indicate one or more categories of data which the application 130 wishes to receive if such data is published by one or more other clients, which may be other MQTT clients. A subscribe acknowledgement ("SUBACK") control packet/indication 414 is sent in response by the data broker 200, and in particular by the MQTT server 220, to the MQTT client 120, and ultimately to the application 130.

In order to reduce the power consumption of the client device 100, the MQTT client 120 may transmit an indication to the data broker 200 to indicate that the client device 100 is entering a mode or state in which it is not capable of, or prefers not to, receive data or other control packets from the data broker 200.

This mode or state is referred to herein as a 'sleep' state. While in this sleep state, the client may disable or reduce certain processing functions, thereby reducing the power consumption of the client device 100.

In some examples, while the data broker 200 is aware that the client device 100 is in the sleep state, the data broker 200 refrains from transmitting message data (e.g., data which falls within the scope of a subscription of the client device 100) to the client device 100. Message data which would otherwise be transmitted to the client device 100 may be discarded or buffered at the data broker 200 for later delivery. A determination as to whether to discard or buffer the message data at the data broker 200 may be based on a quality of service (QOS) requirement associated with the data. For example, message data which, according to its associated QoS requirement, is to be delivered exactly once or at least once is buffered; message data associated with a QoS requirement to be delivered at most once may be discarded.

The indication from the MQTT client 120 may be in accordance with the MQTT protocol. The indication may comprise an indication of a duration, after which the MQTT client 120 will leave the sleep state and be capable of (at least) receiving data or control packets from the data broker 200. The indication may comprise, or be in the form of, a 'keep alive' indication for indicating to the data broker 200 that the MQTT client 120 will transmit a further control packet to the data broker 200 at or before a future time (e.g., at or before the end of the duration). If no packet (e.g., no control packet) is received at the data broker 200 within the indicated duration, the data broker 200 may determine that the MQTT client 120 is no longer reachable, that the publish/subscribe connection with the MQTT client 120 is terminated, or both.

In examples of the present disclosure, the MQTT client 120 is configured to receive, when in the sleep state, a wake up indication for indicating that the MQTT client 120 is to leave the sleep state. The wake up indication may be generated by the network interface 110 or may be in the form of an MQTT control packet.

The wireless communication link 150 may operate in accordance with a wireless communication protocol or wireless communication standard which defines a low power mode of operation. The low power mode may be, for example, an enhanced discontinuous reception (eDRX) mode, such as the eDRX mode specified in 3GPP Release 13, permitting operation in a low power mode for up to 43 minutes (where the wireless communications link is operated in accordance with the 3GPP LTE-M specifications) or for up to three hours (where the wireless communications link is operated in accordance with the 3GPP NB-IoT specifications) or a power saving mode (PSM), such as the PSM specified in 3GPP Release 12, permitting a low power mode period lasting up to 35,712,000 seconds.

When this low power mode is enabled, certain hardware and/or software functions of the network interface 110 may be reduced or disabled, thereby reducing the power consumption of the client device 100. In particular examples, during the low power mode, requirements for the network interface 110 to perform decoding of signals received at the antenna 115 may be reduced (possibly to the extent that no such decoding is required). In some examples, while in the low power mode, the network interface 110 may be required to perform fewer, or no, transmissions. Where transmissions are required during the low power mode, the network interface 110 may be permitted to delay these, to allow certain processes or hardware to be re-started or re-enabled.

The operation of the network interface 110 of the client device 100 when in the low power mode may be in accordance with requirements set out in specifications or standards associated with the wireless communications link. These requirements may be less demanding than requirements which apply when the network interface 110 is not in the low power mode. In some examples, according to the requirements for the low power mode, the network interface 110 is required to monitor (i.e., to receive and attempt to decode) transmissions from the wireless communications network at a reduced frequency and/or within a reduced bandwidth. In some examples, the set of possible transmissions that the network interface 110 is required to monitor for is reduced while in the low power mode; for example, the network interface 110 may be required to monitor only for certain types of messages. In some examples, the network interface 110 is not required to monitor any downlink transmissions while in the low power mode. In some examples, the receipt of control packets transmitted by the data broker 200 is not possible while the network interface 110 is in the low power mode. In some examples, the transmission of control packets to the data broker 200 is not possible while the network interface 110 of the client is in the low power mode.

In some examples, when in the low power mode, the network interface 110 is required to monitor for, and detect, a wake up signal (WUS) indicating that the network interface 110 is to leave the low power mode.

In general, the requirements applicable (for example, as specified in the applicable standard) for the network interface 110 when operating in the low power mode are such that the client device 100 can be operated in a manner that consumes less power than if the network interface 110 were not operating in the low power mode.

The WUS may be a paging signal sent over a physical downlink shared channel (PDSCH) such as the WUS specified in 3GPP Release 15 and 3GPP Release 16 specifications.

According to examples of the present disclosure, a first period 422 ('sleep state period') during which the client device 100 operates in the sleep state is aligned with a second period 432 ('low power mode period') in which it operates in the low power mode. In some examples, the client device 100 indicates to the data broker 200 that it will enter the sleep state for a first time period ending at the sleep state end time, and requests the use of the low power mode for a second time period ending at the low power mode end time, which may be determined based on the first period 422 (for example, based on the sleep state end time). In some examples the ends of the first and second time periods, and in particular, the sleep state end time and the low power mode end time are substantially aligned.

It will be appreciated that the low power mode request may indicate a low power mode end time in any suitable manner. For example, the request may indicate one or more of a requested time period for the low power mode, latest low power mode end time, an earliest low power mode end time, a duration, and a start time. Additionally or alternatively, the low power mode request may indicate a future time period when the low power mode should not be used. For example, the future time period may correspond to a period starting shortly before the time at which the sleep state period 422 will end. In some examples, the low power mode request may indicate a low power mode period, and the low power mode request may request that the low power mode is not active at a time which is after an integer multiple of the low power mode periods. In general, the specific manner in which the time periods are determined and indicated is not limited by the present disclosure.

Examples of possible alignments are shown in FIG. 4 and described further below.

Returning to the example of FIG. 2, the application 130 indicates to the MQTT client 120 a sleep indication 416, indicating a sleep duration. The sleep duration (or 'sleep period') may correspond to a period of time 460 ("duration A") during which the application 130 does not expect or does not require to receive any data from the data broker 200. In addition, or alternatively, where the application 130 provides data to the MQTT client 120 for publishing towards the client 120, the indicated sleep duration may reflect a period of time 460 during which the application 130 will not, or does not expect to and/or does not plan to request the publishing of any data.

The sleep period 460 may be determined taking into account all data that might be transmitted to the client device 100, or may be determined based on only a subset of such data. In an example, the client subscribes to two topics: a first topic is a 'background' or 'low importance' topic and a second topic is a 'high importance' topic. The sleep period 460 is determined considering only data associated with the second topic. Accordingly, the client can reduce its power consumption taking into account important or high priority data, so that such data is not missed (or is received with no, or low, delay), while low priority or low importance data is buffered at the data broker (or discarded) and therefore received with some delay or not at all.

In some examples, the sleep period 460 is determined in accordance with a pre-determined schedule relating to the operation of the client, an expected transmission schedule for data transmitted by the client or to be transmitted to the client, or both. For example, if an aspect of the device's operation is updated in response to received data at most once every 30 minutes, then there is no benefit in receiving any data for a period of 30 minutes after the most recent update. In this example, the sleep period 460 is set to a time period during which received data will not affect the operation of the client device. Firmware or other software upgrades are examples where a device's operation may be updated in response to received data.

In another example, if the client device 100 subscribes to certain data which is generated according to a pre-determined schedule, such as every 10 minutes, then the client device 100 does not expect to receive such data during the 10 minute period following the most recently received data. Accordingly, the sleep period 460 is set to a time period during which no data is expected to be received.

In some examples, the sleep period 460 is determined based on data which has been received from the data broker 200. For example, data which is associated with a particular topic may indicate a time period, and the sleep period 460 is determined based on the indicated time period. The indicated time period may be a time period during which no further data associated with that topic will be transmitted.

The sleep period 460 may be determined based on one or more of the above factors.

In general, the sleep period 460 may be determined in any suitable manner. In some examples, the sleep period 460 is determined irrespective of any characteristics of data which has been, or might in the future be, received from the data broker.

In response to receiving the sleep indication 416, the MQTT client 120 generates a DISCONNECT control packet 418 comprising an indication of a second duration which is transmitted to the data broker 200 via the wireless communications network 190. The end of the second duration may be the sleep state end time. The second duration may be indicated using a session expiry interval field. The second duration ('Duration B') indicated by the DISCONNECT control packet 418 may indicate a time at, or shortly before, the end of the sleep period (duration A 460). The DISCONNECT control packet 418 indicates to the data broker 200 that the MQTT client 120 is not able or not prepared to receive data from the data broker 200 until the second duration has expired, for example, until after the sleep state end time. That is, the DISCONNECT control packet 418 functions as a sleep indication from the client device 100 to the data broker 200.

In response to receiving the DISCONNECT control packet 418, the data broker 200 transmits an MQTT acknowledgement 420 to the client device 100, and considers the client device 100 (or more specifically, the MQTT client 120) to have entered the sleep state, as indicated by the bar 424. While the data broker 200 considers the client device 100 to be in the sleep state, any message data which the data broker 200 determines falls within the scope of the subscription of the MQTT client 120, including that indicated by the SUBSCRIBE control packet 412, is not transmitted to the client device 100. The data broker 200 may instead buffer such data until it determines that the MQTT client 120 is no longer in the sleep state. Alternatively, the data broker 200 may discard the data without buffering it or forwarding it to the client device 100.

At the MQTT client 120, in response to receiving the MQTT acknowledgement 420, the MQTT client 120 enters the sleep state (as indicated by the bar 422).

The MQTT client 120 also sends a network interface low power mode request 426 to the network interface 110 indicating an initial low power mode end time, which may correspond to the end of a third duration. The network interface low power mode request 426 indicates that the network interface 110 should enter, or request to enter, a low power mode until the end of the third duration (e.g., until the initial low power mode end time). In response to receiving the low power mode request 426, the network interface 110 transmits a low power mode request signal 428 to the wireless communications network 190. The low power mode request signal 428 may comprise an indication of the third duration or an indication of the initial low power mode end time, or may indicate a duration, or low power mode end time, which is determined based on the third duration or on the initial low power mode end time. In response to receiving the low power mode request signal 428, the wireless communications network 190 transmits a wireless network acknowledgement 430 to the client device 100. The wireless network acknowledgement 430 may comprise an indication of a duration for which the network interface 110 is permitted to enter the low power mode.

Accordingly, after the receipt of the wireless network acknowledgment 430, the network interface 110 enters into the low power mode (as indicated by the bar 432), in accordance with the standard in accordance with which the wireless communication link 150 is operated.

Figure 3:
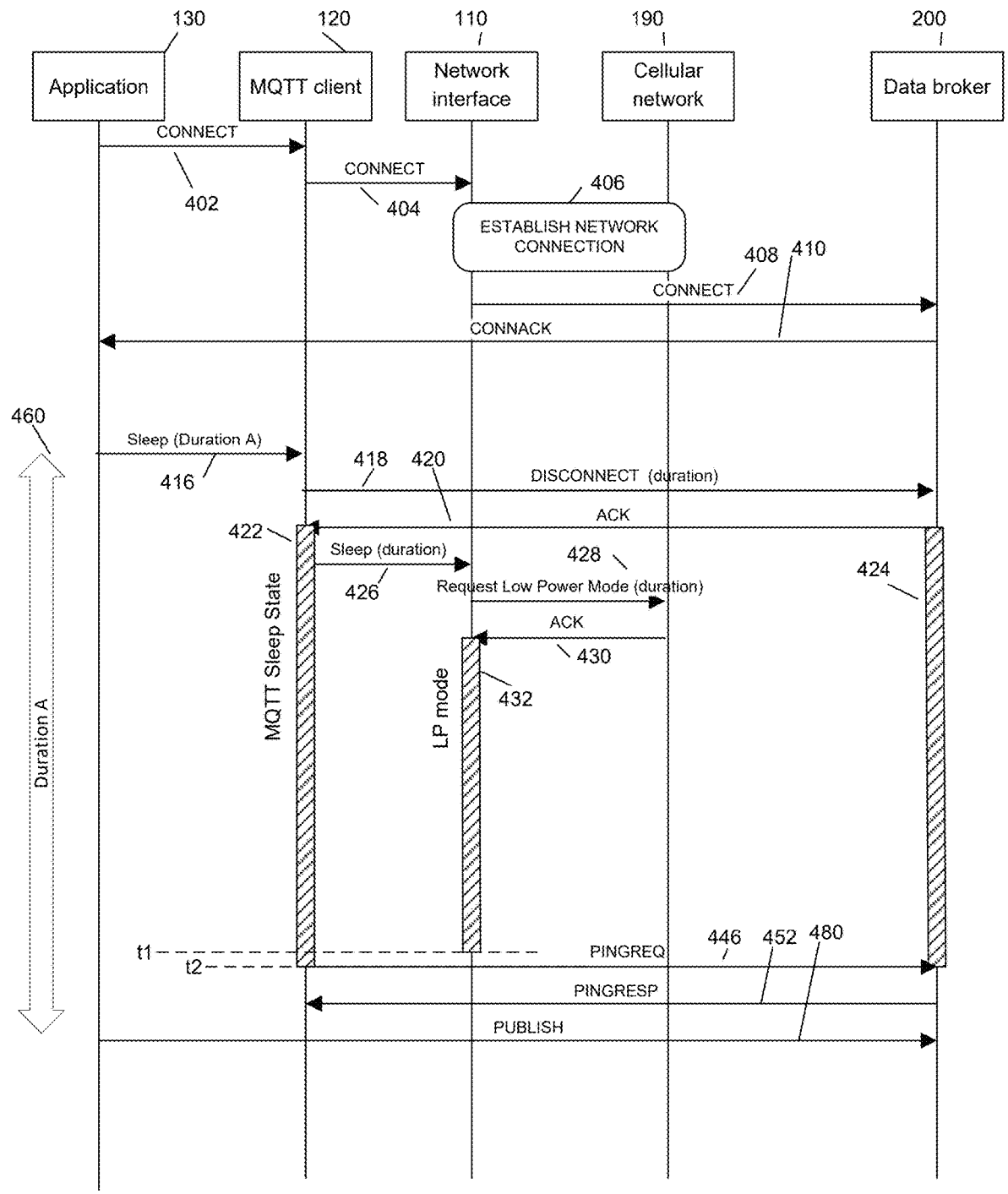
FIG. 3 is a sequence diagram showing an example of messages and packets communicated between components of the system of FIG. 1 in accordance with other examples of the present disclosure.

In some examples, the client autonomously leaves the sleep state 422 and the low power mode 432 at substantially the same time. An example of this is shown in FIG. 3 and described further below.

As shown in the example of FIG. 2, in some examples, the client device 100 (or more specifically, the MQTT client 120) leaves the sleep state and the client device 100 (or more specifically, the network interface 110) leaves the low power mode at substantially the same time in response to one or more indications received from, or via, the wireless communications network 190. Accordingly, in some examples, the sleep state period 422 and the low power mode period 432 end at substantially the same time in response to the one or more indications.

In the example of FIG. 2, in accordance with some embodiments of the present disclosure, a wake up indication transmitted via the wireless communications link 150 and received at the network interface 110 of the client device 100. In response, the network interface 110 exits the low power mode 432. The wake up indication also (directly or indirectly) triggers a procedure which causes the MQTT client 120 to leave the sleep state 422.

In some examples (not shown in FIG. 2) in response to a first wake up indication transmitted via the wireless communications link 150 and received at the network interface 110 of the client device 100, the network interface 110 exits the low power mode 432. The first wake up indication may be a wake up signal generated at the wireless communications network 190. In response to receiving a second wake up indication, the MQTT client 120 initiates a procedure to leave the sleep state 422. The second wake up indication may be generated at the data broker 200 and may be in the form of, or may comprise, an MQTT control packet. The first wake up indication may be generated at the wireless communications network 190 in response to receiving the second wake up indication.

In some examples, the wake up signal 442 (such as the first wake up indication in the previous example) and wake up indication (such as the second wake up indication in the previous example) are transmitted together from the wireless communications network 190 to the client device 100. For example, the wake up signal 442 may indicate that a further (simultaneous or subsequent) transmission is being made to the client device 100, where the further transmission comprises the wake up indication.

In some other examples, such as is shown in FIG. 2, in response to receiving the wake up signal 442, the network interface 110 of the client device 100 generates a wake up indication and sends it to the MQTT client 120, which causes the MQTT client 120 to initiates the procedure to leave the MQTT sleep state.

In the example of FIG. 2, a wake up signal (WUS) 442 is transmitted in accordance with the wireless communications standard. For example, the WUS 442 may be a paging signal transmitted on a physical downlink shared channel in the cell 198.

In the example of FIG. 2, the transmission of the WUS 442 by the wireless communications network 190 is in response to a wake up control request 440 transmitted by the data broker 200 to the wireless communications network 190. The network interface 210 of the data broker 200 may transmit the wake up control request 440 in response to a request from the sleep coordination function 225 of the data broker 200.

Unlike, for example, the SUBACK control packet 414 which is generated by the data broker 200 and is forwarded by the wireless communications network 190 to the client device 100, the wake up control request 440 is not for transmission to the client device 100, but is a request to the wireless communications network 190 requesting the transmission of the WUS 442, in accordance with the wireless communications standard. The wake up control request 440 may comprise an identifier of the client device 100. The wake up control request 440 may be transmitted from the data broker 200 to the network controller 195 of the wireless communications network 190 using a protocol or interface for allowing control of the behaviour of the wireless communications network 190 by an external device, such as the data broker 200.

In response to receiving the wake up control request 440, the wireless communications network 190 transmits the wake up signal (WUS) 442 in accordance with the relevant wireless communications standard, to the client device 100.

In response to receiving the WUS 442, the network interface 110 of the client device 100 leaves the low power mode of operation 432, and sends a wake up indication 444 to the MQTT client 120. In response to the wake up indication 444, the MQTT client 120 initiates a process to leave the sleep state 422 and enter a state in which the MQTT client 120 is able to, at least, receive data packets from the data broker 200.

Figure 4A:
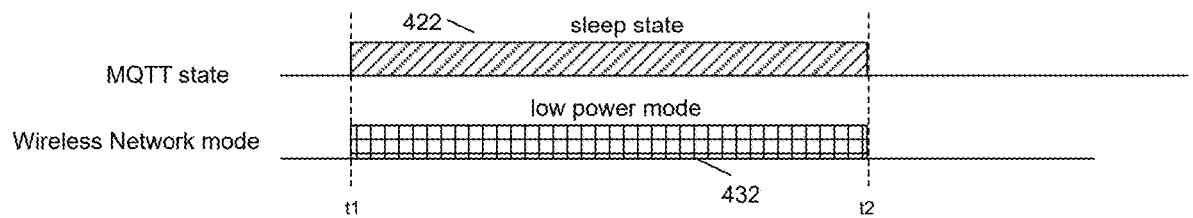
FIGS. 4A-4C show a series of example timelines in which a sleep state and a low power mode are aligned in accordance with examples of the present disclosure.
Figure 4B:
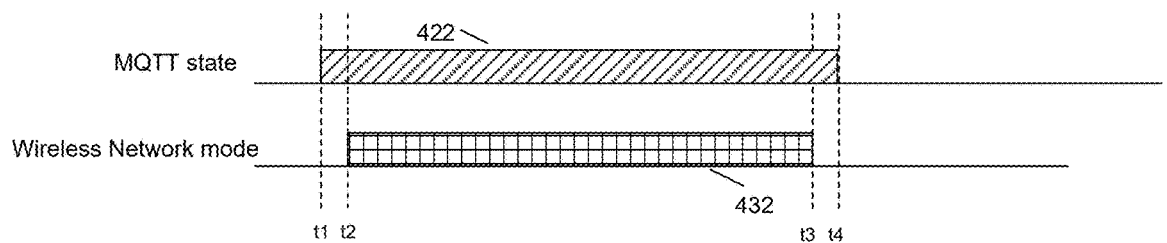
Figure 4C:
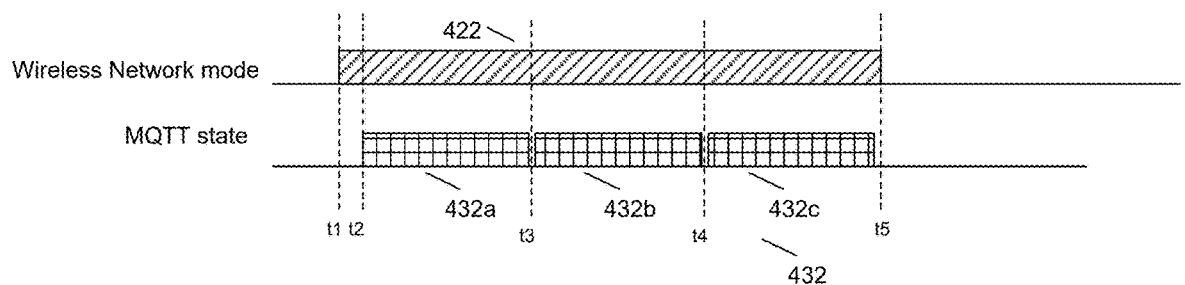

In some examples, the low power mode period 432 comprises distinct time periods separated by short intervals, as illustrated in FIG. 4C and described below. During the intervals, the network interface 110 may be required to monitor for transmissions by the wireless communications network 190 and it may therefore not be necessary to send a WUS. Instead, the wireless communications network 190 may transmit the wake up indication to the client device 100. In response to receiving the wake up indication, the network interface 110 forwards the wake up indication to the MQTT client 120 and leaves the low power mode.

The MQTT client 120 then transmits an indication to the broker to indicate that the MQTT client 120 has left the sleep state and is now in a state in which data may be transmitted to the MQTT client 120. This indication may also indicate to the broker that the connection to the client 120 is still maintained (i.e., it may function more generally as a 'keep alive' indication). Specifically, in the example of FIG. 2, the MQTT client 120 generates a PING REQ (ping request)

control packet 446. The PING REQ control packet 446 may be a control packet which is conventionally used as a 'keep alive' message, to indicate to the data broker 200 that the client device 100 is still operational, and to check that connectivity with the data broker 200 is maintained. Where the MQTT client 120 is considered by the data broker 200 to be in the sleep state 424, the PING REQ control packet 446 is interpreted by the data broker 200 as an indication that the MQTT client 120 has left the sleep state 422 and is now in a state in which data may be transmitted to the MQTT client 120.

Accordingly, at the transmission of the PING REQ control packet 446 the MQTT client 120 leaves the sleep state 422 and, in response to the receipt of the PING REQ control packet 446 the data broker 200 determines that the MQTT client 120 has left the sleep state 422 (as indicated by the end of the bar 424).

In the example of FIG. 2, the wake up control request 440 is transmitted by the data broker 200 in response to a determination that data is to be published to the MQTT client 120 before the MQTT client 120 autonomously leaves the sleep state in accordance with the duration indicated in the DISCONNECT control packet 418.

In the example of FIG. 2, at step 434, the data broker 200 receives data from another client which is within scope of a subscription of the MQTT client 120 and, based on the determination that the MQTT client 120 is in the sleep state, determines that the data is to be buffered, and accordingly buffers the data at step 436.

Subsequently, at step 438, the data broker 200 receives further data which is within scope of a subscription of the MQTT client 120. Based on one or more of the receipt of the data at step 434 and the receipt of the further data at step 436, the data broker 200 determines that the data and further data should be transmitted to the MQTT client 120, before the MQTT client 120 autonomously leaves the sleep state in accordance with the duration indicated in the DISCONNECT control packet 418, for example, before the sleep state end time. In response to this determination, the data broker 200 transmits the wake up control request 440.

The determination that data (such as the data and further data referred to above) should be transmitted to the MQTT client 120 before it autonomously leaves the sleep state may be based on a priority associated with the data. For example, one or more topics may be associated with a high priority status, and the data may be associated with such a topic. Additionally or alternatively, the determination may be based on a buffer status. For example, the determination may be based on a determination that a buffer capacity of a buffer in which the data is currently (or is to be) stored is below a predefined threshold.

After receiving the PING REQ control packet 446, the data broker 200 then transmits PUBLISH control packets 448, 450 containing the data and the further data received at steps 434 and 438, respectively.

In some examples, the MQTT client 120 may transmit acknowledgements of the received data (not shown in FIG. 2).

After the data and further data have been transmitted to the MQTT client 120, the data broker 200 transmits a 'return to sleep' indication to the MQTT client 120, to indicate that the data broker 200 does not have any further buffered data for transmission to the MQTT client 120. In the example of FIG. 2, the return to sleep indication is a PING RESP control packet 452. Thus, in some examples, the return to sleep indication is (or is within) a message also used to acknowledge a 'keep alive' message, thus indicating that the connection between an MQTT client and data broker is maintained.

After receiving the return to sleep indication, the client 120 may enter the sleep state. The MQTT client 120 may send a further network interface low power mode request 426 to the network interface 110. In general, the process of entering the sleep state, entering the low power mode, and leaving the low power mode simultaneously with, or very shortly before, leaving the sleep state, may be repeated in order to ensure low power consumption of the client. In the example of FIG. 2, the data broker 200 considers the MQTT client 120 to be in the sleep state, as indicated by bar 464, and the MQTT client 120 enters the sleep state for a second sleep state period 462.

FIG. 3 is a sequence diagram showing an example of messages and packets transmitted in accordance with examples of the present disclosure.

In the example of FIG. 3, the application 130 does not request any subscription to data, and accordingly no SUBSCRIBE control packet is transmitted, and no SUBACK control packet is received.

Otherwise, the sequence shown in FIG. 3 is the same as that shown in FIG. 2, and described above, up until the point where the MQTT client 120 of the client device 100 has moved to the sleep state 422, and the network interface 110 of the client device 100 enters into the low power mode 432.

In the example of FIG. 3, the application 130 obtains sensor data from the sensor 140 and publishes this in accordance with a predictable schedule. The duration "duration A" (indicated in the sleep indication 416) corresponds to a time period in which the application 130 does not expect to request the publishing of any data (such as sensor data from sensor 140), and ends at (or around) a time when, according to the schedule, application 130 is to publish data from the sensor 140.

During the period 424 when the data broker understands that the MQTT client 120 is in the sleep state, the data broker does not make any determination to transmit a control packet to the MQTT client 120. In the example of FIG. 3, this is because the MQTT client 120 has no active subscription and so no data is received at the data broker 200 which is within the scope of any subscription of the MQTT client 120. In other examples, the reasons for not making any determination to transmit a control packet to the MQTT client 120 may be different.

In the example of FIG. 3, the network interface 110 operates in the low power mode 432 until time t1, in accordance with the duration or low power mode end time indicated in the low power mode request signal 428 and/or in the wireless network acknowledgement 430. Time t1 is shortly before time t2, at which the MQTT client 130 exits the sleep state 422. In the example of FIG. 3, time t2 occurs shortly before the end of 'duration A' 460. Accordingly, it can be ensured that, by the time the application 130 requests the publishing of data, both the MQTT client 120 and the network interface 110 are no longer operating in the sleep state or the low power mode, respectively.

In some examples, a keep-alive indication is transmitted periodically by the client 120 in order to indicate to the data broker that it is still connected. The PING REQ message 446 of FIG. 3 may function as this keep-alive indication, to prevent the data broker from considering the client device 100 to be in a 'lost' or 'disconnected' state.

In the example of FIG. 3, the PING REQ 446 serves essentially the same purpose as in the example of FIG. 2, i.e., as an indication that the MQTT client 120 has left the sleep state 422 and is now in a state in which data may be transmitted to the MQTT client 120. In the example of FIG. 3, the PING REQ control packet 446 is sent in response to the ending of the sleep state 422. The PING REQ message 446 may be transmitted shortly before the sleep state end time, in order to ensure that the data broker 200 does not determine, at or after the sleep state end time, that the connection between the data broker 200 and the client device 100 is terminated. This is in contrast to the example of FIG. 2 in which the MQTT client 120 and the network interface 110 leave the sleep state and low power mode (respectively) in response to signals or indications received at the network interface 110.

In the example of FIG. 3, the data broker 200 has no buffered data for the MQTT client 120, and accordingly, in response to receiving the PING REQ control packet 446, transmits the PING RESP control packet 452 to the MQTT client 120.

Subsequently, the application 130 requests the publishing of sensor data, and the corresponding PUBLISH request/control packet 480 is sent to the data broker 200. The alignment of the sleep state period 422 and low power mode period 432 such that the ends of the periods are substantially aligned allows the transition time (i.e. the time from time t1 to time t2) to be short, and the power consumption of the client device 100 can be effectively reduced. In particular, the network interface 110 operates in the low power mode while, according to a schedule, there is no MQTT control packet to be transmitted. The alignment of the sleep state period 422 and the low power mode period 432 may arise as a result of the reception of a wake up indication, or as a result of alignment of the sleep state end time and the low power mode end time (which may apply if no wake up indication is received).

FIGS. 4A-4C shows a series of time lines in which a sleep state and a low power mode are aligned in accordance with examples of the present disclosure.

In the example of FIG. 4A, the sleep state and low power mode both start at time t1 and end at time t2. Accordingly, the wireless communications link is operated in the low power mode for the same time period 432 as the time period 422 during which the MQTT state is the sleep state. This alignment can result in reduced power consumption because the wireless communications link is operated in the low power mode for all of the period when no data or control packets associated with the MQTT protocol are being transmitted or received.

In the example of FIG. 4B, the sleep state period 422 starts at time t1, and the low power mode period 432 starts at time t2, which is shortly after time t1. The sleep state period 422 ends at time t4, and the low power mode period 432 ends at time t3, which is shortly before time t4. Accordingly, although the wireless communications link is operated in the low power mode for substantially the entire duration when the duration for which the MQTT state is the sleep state, short time periods (from time t1 to time t2, and from time t3 to time t4) allow the network interface 110 to complete any transmissions or receptions (including those which may be unrelated to the MQTT protocol).

In the example of FIG. 4C, the sleep state period 422 starts at time t1 and ends at time t5. The low power mode period 432 comprises a plurality of low power mode sub-periods 432a-c which start at (respectively) times t2, shortly after t3 and shortly after t4. The sub-periods 432a-c end at (respectively) shortly before t3, shortly before t4, and shortly before t5. The sub-periods 432a-c collectively are aligned with the sleep state period 422 and the collective duration of the sub-periods 432a-c is substantially the same as the duration of the sleep state period 422. Accordingly, the low power mode is ended prior to time t5, to allow the transmission or reception of MQTT-related data or control packets, while providing brief periods (around times t3 and t4) when the low power mode is not enabled, to allow for transmission or reception of messages which may be unrelated to MQTT. For example, these messages may relate to other applications on the client device, or may relate to the operation of the wireless communications link.

The time periods around times t3 and t4 may also be used for the forwarding of a wake up indication to the client device 100, without requiring the transmission of a separate wake up signal.

Figure 5:
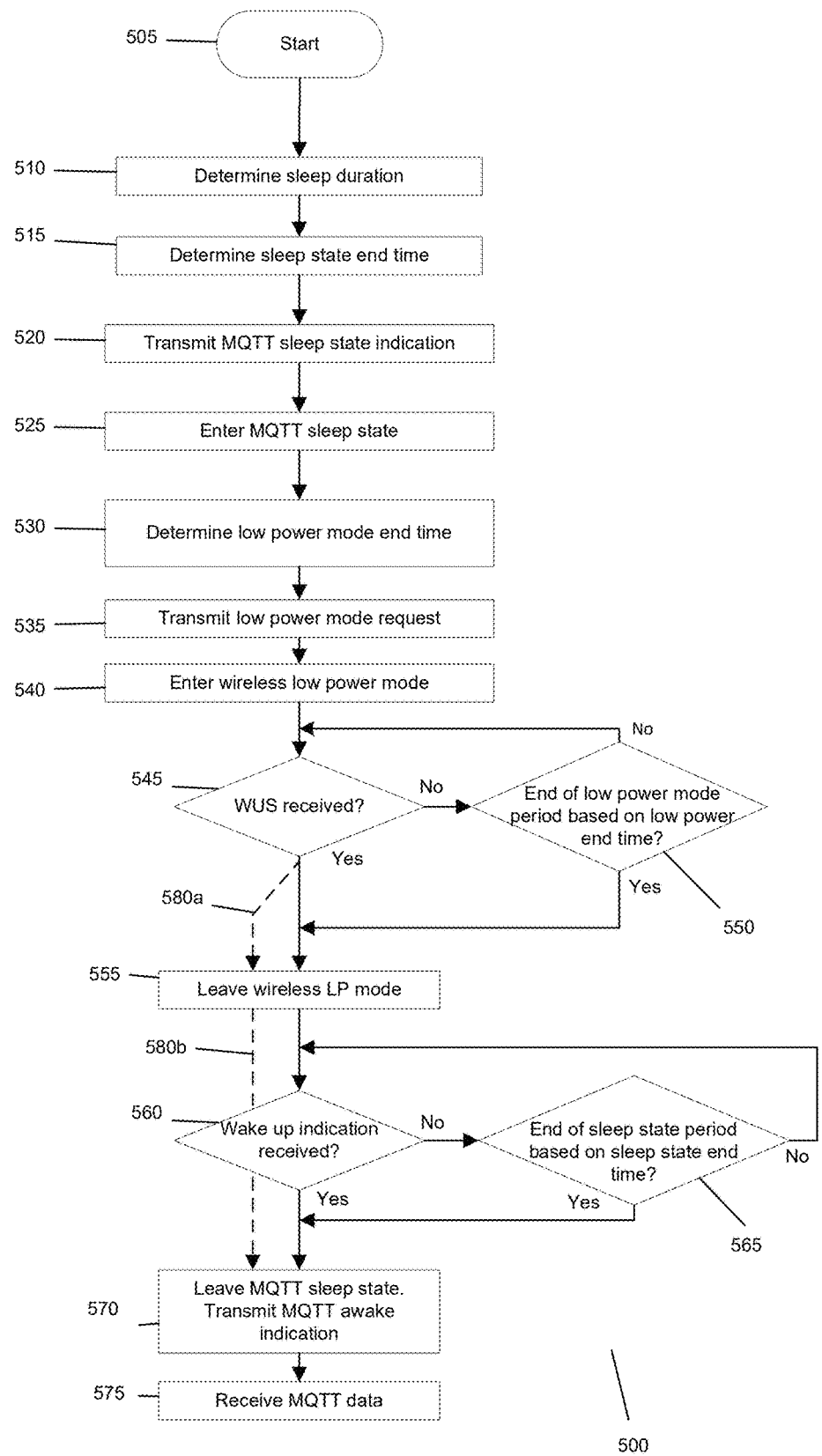
FIG. 5 is a flow chart illustrating a method carried out by a client in accordance with examples.

FIG. 5 is a flow chart illustrating a method 500 carried out by a client, such as the client device 100, in accordance with examples. It will be appreciated that the method 500 comprises operations which are carried out by the MQTT client 120 of the client device 100 and operations which are carried out by the network interface 110 of the client device 100.

The process starts at step 505. In some examples (not shown in FIG. 5), the client device 100 establishes a wireless connection with the wireless communications network 190. Via the established wireless connection, the MQTT client 120 establishes a connection with the MQTT server 220 at the data broker 200. In some examples, the client device 100 transmits an MQTT subscription request to the data broker to indicate that it wishes to receive published data which meets certain criteria. The criteria thus define a scope of the subscription. Examples of these steps are shown in FIG. 2 and are described above.

Control then passes to step 510. At step 510, the sleep period 460 is determined, as described above in the context of FIG. 2.

At step 515, the client device 100 determines the sleep state end time. This may be determined by the sleep coordination function 125 of the client device 100.

As described above in the context of FIG. 2, the sleep state end time may be based on the determined sleep period 460. In some examples, the sleep state end time ends at the end of the sleep period 460. In some examples, the sleep state end time is before end of the sleep period 460. In particular, the sleep state end time may be slightly before (for example, 5 seconds before or 1 second before) the end of the sleep period 460, in order to ensure that the MQTT client 120 is not in the sleep state at the end of the determined sleep period 460.

At step 520, the MQTT client 120 transmits a sleep indication (such as the DISCONNECT packet 418 of FIG. 2) comprising an indication of the sleep state end time. The indication of the sleep state end time may be in any suitable form. For example, the indication may be in the form of a requested MQTT sleep period duration, where the sleep state end time is the time of transmission of the control packet plus the requested MQTT sleep period duration. The sleep indication may be transmitted via the network interface 110 of the client device 100.

The MQTT client 120 may receive an acknowledgement, such as the ACK control packet 420 of FIG. 2, from the MQTT server 220 of the data broker 200. The acknowledgement may comprise an indication of a sleep state end time which differs from that indicated by the MQTT client, in which case the MQTT client may update the sleep state end time to that indicated by the MQTT server 220.

In some examples, step 520 is omitted.

At step 525, the MQTT client 120 enters the sleep state and the sleep state period 422 begins, as shown in FIG. 2.

Entering the sleep state may comprise notifying an application (such as application 130) that the sleep state is being entered. While in the sleep state, the MQTT client 120 may expect that no message data will be transmitted to the client device 100 from the data broker 200. The client device 100 may expect that no control packets will be transmitted to the client device 100 from the data broker 200, with the possible exception of a wake up indication, as described further below.

While in the sleep state, the client device 100 may reduce or disable certain processing functions, resulting in a reduced power consumption.

When entering the sleep state, the MQTT client 120 may configure a timer to end at or before the sleep state end time or may schedule a transmission of a suitable control packet before the sleep state end time.

At step 530, the client device 100 determines a low power mode end time. This may be carried out by one or more of the sleep coordination function 125 and the network interface 110. In some examples, an initial low power mode end time is determined based on one or more of the sleep period 460 and the sleep state end time. In some examples, the initial low power mode end time is equal to the sleep state end time. In some examples, the initial low power mode end time is earlier than the sleep state end time by a predetermined duration. In an example, the predetermined duration is 1 second. In another example, the predetermined duration is 5 seconds. In some examples, the predetermined duration is sufficient for the client device 100 (or, more specifically, the network interface 110) to have completed any procedures associated with leaving the low power mode. The MQTT client 120 or the sleep coordination function indicates the initial low power mode end time to the network interface 110 by means of a network interface low power mode request. The network interface 110 determines, based on the initial low power mode end time, the low power mode end time, which in some examples is equal to the initial low power mode end time.

In some examples, the low power mode end time is aligned with the sleep state end time such that (in the absence of any wake up signal or wake up indication) the low power mode period 432 and the sleep state period 422 are aligned. FIG. 4, described above, illustrates examples of alignment between the low power mode period 432 and the sleep state period 422.

At step 535, the client device 100 transmits the low power mode request signal 428 comprising an indication of the low power mode end time. The sleep coordination function 125 may generate a network interface low power mode request which is sent to the network interface 110 to request the transmission of the low power mode request signal 428. The indication of the low power mode end time may be in any suitable form. For example, the indication may be in the form of a requested low power mode period duration, where the low power mode end time is the time of transmission of the wireless control packet plus the requested low power mode period duration.

The client device 100 may receive at the network interface 110 an acknowledgement, such as the wireless network acknowledgement 430 of FIG. 2, from the wireless communications network 190. The acknowledgement may comprise an indication that the low power mode end time is to be different from that indicated by the low power mode request signal 428.

The acknowledgement may indicate, implicitly or explicitly, that the low power mode end time requested by the client device 100 is accepted.

In some examples, step 535 is omitted.

In some examples, step 530 is omitted, and the network interface low power mode request (if applicable) and the low power mode request signal 428 transmitted at step 535 indicate a request to enter the wireless low power mode, without indicating any end time or time period. In some examples, the low power mode end time is not determined before the network interface 110 of the client device 100 enters the low power mode.

In some examples, as described above, the wireless communication network 190 explicitly permits the client device 100 to enter the low power mode. In some examples, the client device enters the low power mode after sending the low power mode request signal 428 irrespective of any response (or absence of response) from the wireless communication network 190. In some examples, the client device enters the low power mode after sending the low power mode request signal 428 only if it receives an acknowledgement indicating that the low power mode request signal 428 has been received at the wireless communication network 190.

At step 540, the client device 100 (and specifically, the network interface 110) enters the low power mode, and subsequently operates in the low power mode for the low power mode period 432 (which may comprise sub-periods 432a-c, as described above in the context of FIG. 4). In some examples, this may be in response to receiving the acknowledgement. In some examples, no acknowledgement is received (for example, because according to the specifications governing the operation of the wireless communications link 150, no such acknowledgement is required) and the client device 100 (and specifically, the network interface 110) enters the low power mode after sending the low power mode request signal 428.

When entering the low power mode, the network interface 110 may configure a timer to end at or before the end of the low power mode period 432 or the first sub-period 432a, which may be determined based on the low power mode end time, to allow a subsequent determination as to whether the network interface 110 is to continue operating in the low power mode. In general, the low power mode end time may be used to determine an end time of the low power mode period 432.

As described above, the network interface 110 may then monitor transmissions from the wireless communications network 190 in accordance with the requirements for the low power mode.

At step 545, the network interface 110 determines whether a wake up signal (WUS) is received. The WUS may be transmitted in accordance with the wireless communications standard. The WUS indicates that the network interface 110 is to leave the low power mode. This determination may comprise monitoring a downlink channel, attempting to decode signals received on the downlink channel, and determining whether the decoded signals comprise the WUS. The downlink channel may be a paging channel.

If no WUS is received, the process continues with step 550. At step 550, the client device 110 (for example, the network interface 110) determines whether the low power mode period 432 has ended, for example, based on a timer started at step 540. If it has not, then control returns to step 545.

In some examples, such as where the duration of the low power mode period 432 is not determined prior to the start of the low power mode period 432, step 550 is omitted. In such examples, if no WUS is received at step 545, then control returns to step 545.

In some examples, step 545 is omitted; in such a case, after step 540 (and after step 550 if the low power mode period 432 has not ended), control passes directly to step 550. Step 545 may be omitted in examples in which the client is not required to monitor any downlink transmissions while in the low power mode.

If, at step 545, it is determined that the WUS is received ('Yes') or, at step 550, it is determined at that the low power mode period 432 has ended ('Yes'), then control passes to step 555. At step 555, the network interface 110 leaves the low power mode. This may comprise resuming monitoring of transmissions in accordance with the requirements that apply to the network interface 110 when it is not in the low power mode, and may comprise enabling, or increasing certain processing. If a timer for indicating the end of the low power mode period 432, is running, this timer may be stopped. The network interface 110 may generate a notification that it is no longer in the low power mode. Based on this indication, the MQTT client 120 may determine that the network interface 110 is no longer in the low power mode. In some examples (such as in the example shown in FIG. 3), control then passes to step 560. In some examples, one or both of step 560 and step 565 are performed in parallel with one or both of step 545 and step 550.

At step 560, the client device 100 (for example at the MQTT client 120) determines whether a wake up indication has been received. The wake up indication indicates that the MQTT client 120 is to leave the sleep state.

In some examples, a received WUS functions as, or (as shown in the example of FIG. 2) triggers an internal generation of, the wake up indication. In some examples, the received WUS is received together with the wake up indication. For example, the WUS and wake up indication may be included within a single transmission sent on the wireless communications link 150.

Accordingly, in some examples, when it is determined at step 545 that a WUS has been received ('Yes'), then it is also (or implicitly) determined at step 560 is that a wake up indication has been received ('Yes'). This is indicated by the dashed arrows 580a, 580b, which indicate that, in response to a positive determination at step 545, the process continues with step 555 and step 570.

In some examples, the wake up indication is (or is comprised within) an MQTT control packet generated at the data broker 200 and received at the client device 100.

If, at step 560, it is determined that no wake up indication has been received ('No'), then the process continues with step 565. At step 565, the client determines whether the sleep state period 422 has ended, or is about to end, based on the sleep state end time. This determination may be based on the timer or the schedule set at the start of the sleep state period 422. The outcome of the determination at step 565 may be positive ('Yes') sufficiently before the sleep state end time to allow, at step 570, the transmission of a control packet to the MQTT server 220 to function as a 'keep-alive' indication and thus avoid the MQTT server 220 determining that the connection between the MQTT server 220 and the MQTT client 120 is terminated.

If it has not, then control returns to step 560. In some examples, control returns to step 540, and the client device 100 re-enters the low power mode if it is determined that, according to the requirements of the low power mode, the client device 100 is to re-enter the low power mode. For example, referring to the example of FIG. 4C then, shortly after time t3, the network interface 110 re-enters the low power mode, having not received a wake up signal during the short time period that the client device 100 is not in the low power mode.

In some examples, step 565 is omitted. In such examples, if no wake up indication is received at step 560 ('No'), control remains at step 560. Step 565 may be omitted in examples in which the duration of the sleep state period 422 is not determined before the start of the sleep state period 422.

In some examples, step 560 is omitted; in such a case, after step 555 (and after step 565 if the sleep mode period 422 has not ended and, if applicable, is not about to end), control returns directly to step 565.

If, at step 560, it is determined that the wake up indication is received ('Yes') or, at step 565, it is determined at that the sleep state period 422 has ended, or is about to end, based on the sleep state end time ('Yes'), then control passes to step 570.

At step 570, the MQTT client 120 leaves the sleep state. This may comprise configuring the client device 100 to receive data transmitted by the data broker. It may further comprise transmitting by the MQTT client 120 an awake indication to the MQTT server 220 of the data broker 200, to indicate that the MQTT client 120 is no longer in the sleep state and is prepared to receive data. The MQTT PING REQ control packet 446 of FIG. 2 is an example of the awake indication. If a timer for indicating the end of the sleep state period 422, is running, this timer may be stopped.

After step 570, control passes to step 575, in which the client device 100 receives message data transmitted by the data broker 200.

Subsequently, the client device 100 may receive a return to sleep indication transmitted by the data broker 200. The MQTT PING RESP control packet 452 of FIG. 2 is an example of the return to sleep indication. The return to sleep indication may indicate that the MQTT server 220 of the data broker has no more data to be transmitted to the MQTT client 120.

In response to receiving the return to sleep indication, the process of FIG. 5 may be repeated. By way of example, the process may re-start from step 510 or step 515.

Providing a wake up indication for triggering the MQTT client 120 to leave the sleep state can allow the data broker 200 to indicate to the MQTT client 120 that data (which may meet certain predetermined criteria) is to be transmitted to the MQTT client 120, and that the client device 100 should therefore be prepared to receive the data. This can allow the MQTT client 120 to determine, and request, a later sleep state end time than would otherwise be the case if the MQTT client 120 were required to autonomously leave the sleep state in order to avoid excessive delay or loss of data; alternatively, the MQTT client 120 may enter the sleep state, without any indication of a sleep state end time.

By determining an appropriate low power mode end time and an appropriate sleep state end time, the network interface 110 is able to operate in the low power mode for substantially all of the time period when the MQTT client 120 is in the sleep state, thereby avoiding unnecessary power consumption at the network interface 110 during a time period when the data broker 220 is expected to (or is required to) refrain from transmitting message data to the client device 100.

In the process of FIG. 5, there is a period of time during which the client device 100 is in the sleep state but is not in the low power mode. This period of time is referred to as a 'transition time'. The transition time extends from the completion of step 555 until the completion of step 570.

By determining a low power mode end time which is substantially aligned with the sleep state end time, it can be ensured that in the case where no WUS or wake up indication is received, the transition time is small relative to the duration of the sleep state period 432. For example, the sleep state period 432 may have a duration of several minutes or longer, while the transition time may have a duration of less than a minute, and more preferably, of less than 10 seconds.

Similarly, the use of a wake up signal as, or to trigger, a wake up indication, can minimise the transition time by ensuring that the time period between a positive determination at step 545 and a positive determination at step 560 is short.

In examples where, while in the sleep state, the client device 100 leaves and re-enters the low power mode (for example, as in the example shown in FIG. 4C), the total time during which the client device 100 is in the sleep state but is not in the low power mode can be reduced and the total power consumption of the client device (including of the network interface 110) can be minimised.

In some examples, the total time during which the client device is in the sleep state but is not in the low power mode is less than around 10% of the duration of the sleep state period 422. In some such examples, the total time during which the client device is in the sleep state but is not in the low power mode is less than 1% of the duration of the sleep state period 422.

Figure 6:
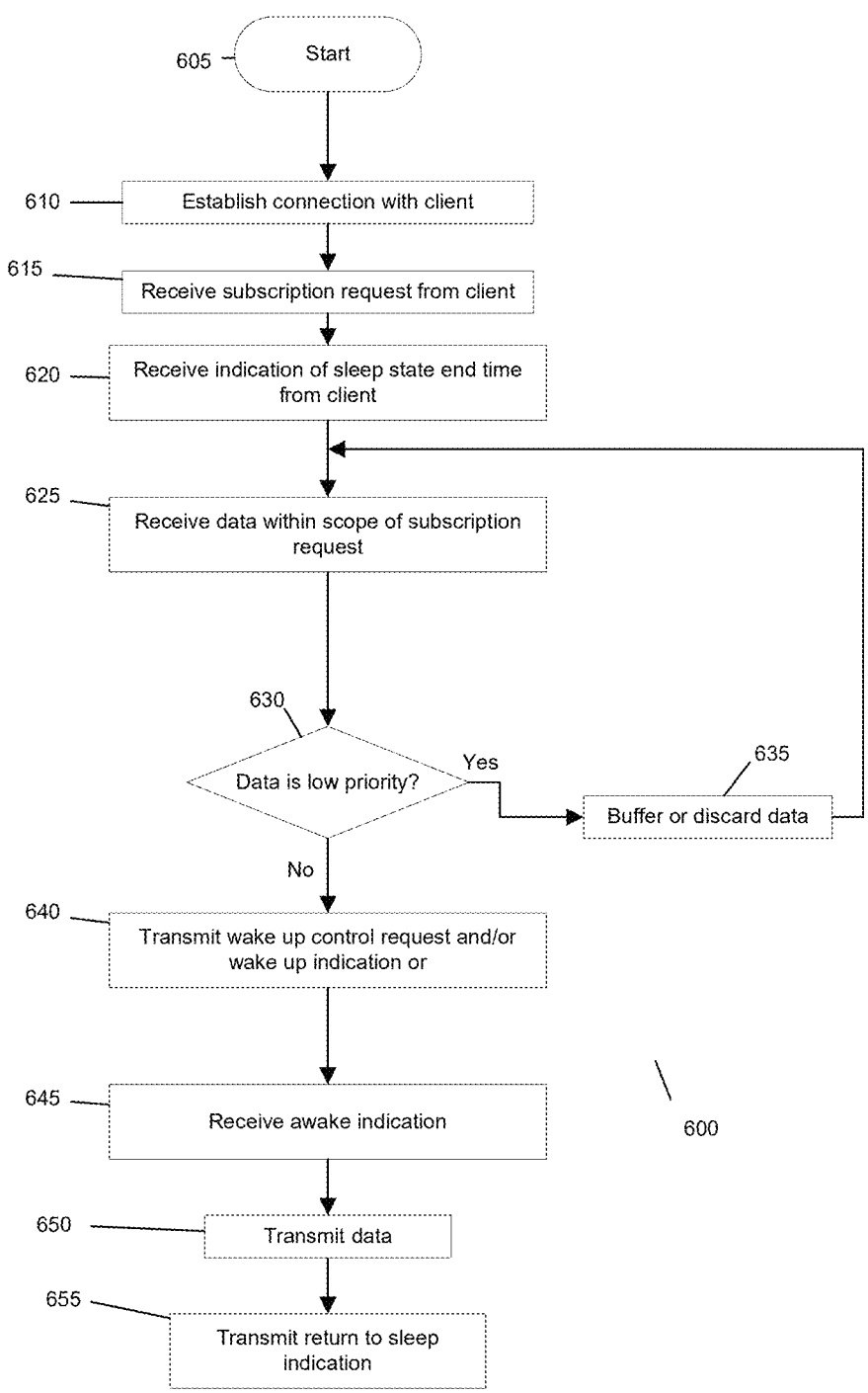
FIG. 6 is a flow chart illustrating a method carried out at a data broker in accordance with examples.

FIG. 6 is a flow chart illustrating a method 600 carried out at a data broker, such as the data broker 200 of FIG. 1, in accordance with examples. Each step in the method 600 may be carried out by one or more of the MQTT server 220, the sleep coordination function 225 and the network interface 210 of the data broker 200.

The process starts at step 605 and control passes to step 610. At step 610, the data broker establishes a connection with the client, such as client device 100 of FIG. 1. The connection may be via a wireless communications network, such as the wireless communications network 190 of FIG. 1. Examples of these steps are shown in FIG. 2 and are described above.

In some examples, the data broker 200 determines that the connection with the client device 100 is via a wireless communications network which supports a low power mode. The data broker 200 may also determine an identity of the client device 100 which is recognised by the wireless communications network 190. For example, if the communication network is a 3GPP-based network, the identity may be an international mobile subscriber identity (IMSI). These determinations may be by means of an indication transmitted by the client device 100, or by means of a pre-configured association at the data broker 200. In some examples, the data broker 200 communicates with the communications network 190 (either directly, or by means of a proxy) and accordingly determines that the client device 100 is connected to the communications network 190.

Control then passes to step 615, in which the MQTT server 220 of the data broker 200 receives a subscription request from the MQTT client 120 of the client device 100. The subscription request may be in the form of the SUBSCRIBE control packet 412 of FIG. 2. The MQTT server 220 stores an association between the MQTT client 120 and the scope of the subscription request. The data broker 200 may transmit, in response, an acknowledgement to the client device 100. The acknowledgement may be in the form of the SUBACK control packet 414 of FIG. 2.

The process continues at step 620. At step 620, the MQTT server 220 receives an indication from the client device 100 that the MQTT client 120 of the client device 100 is entering (or is requesting to enter) the sleep state. The indication may comprise an indication of the sleep state end time. In response, the MQTT server 220 may transmit an acknowledgement. The acknowledgement may indicate, implicitly or explicitly, that the sleep state end time is to be updated. The MQTT server 220 then associates the client with the sleep state, for example, by storing an indication that the MQTT client 120 is in the sleep state and, in some examples, storing the sleep state end time, or starting a timer based on the sleep state end time.

At step 625, the MQTT server 220 receives message data published by a different MQTT client from the MQTT client 220 of the client device 100. The MQTT server 220 determines that it is within the scope of the subscription request received at step 615. This may comprise determining that a topic associated with the data matches a topic within the scope of the subscription which is associated with the MQTT client 120.

At step 630, the data broker 200 (for example, at the sleep coordination function 225) determines whether the received data is low priority data and therefore does not require immediate delivery to the client. If it is ('Yes'), then control passes to step 635, in which the data is buffered or discarded, and control subsequently returns to step 625. If the data is not low priority data ('No'), then control passes to step 640.

In the example of FIG. 6, the determination that the client should leave the sleep state is based on the receipt of data which is not low priority. However, the determination may be for any reason, and the present disclosure is not so limited. As described above in the context of FIG. 2, the determination may be based on a buffer status associated with a buffer within which data to be transmitted to the client is (or would be) stored. The determination that data is low priority may be based on one or more of a topic associated with the data, an identity of the client that originally published the data, and the contents of the data itself.

At step 640, in some examples, the data broker transmits a wake up control request to the wireless communications network 190. This wake up control request is for requesting the wireless communications network 190 to cause the client device 100 to leave the low power mode. Step 640 may comprise the sleep coordination function 225 of the data broker 200 requesting the network interface 210 of the data broker 200 to transmit the wake up control request. The wake up control request may comprise an indication of the identity associated with the client device 100, such as the IMSI.

In some examples, at step 640 the MQTT server 220 transmits a wake up indication to the MQTT client 120. In some examples, this wake up indication is an MQTT control packet transmitted via the wireless communications network 190 to the client device 100. In such examples, the wake up indication is transmitted in substantially the same manner as any other control packet destined for the client. In some examples, the wake up indication is transmitted after the transmission of the wake up control request; in other examples, the wake up indication is transmitted without first sending the wake up control indication. In some examples, the wake up indication is transmitted together with the wake up control request.

Control then passes to step 645, in which the data broker receives an awake indication from the client device 100. As described above, the awake indication indicates that the client is no longer in (or is leaving) the sleep mode and is configured to receive data from the data broker. Accordingly, the association at the data broker between the sleep state and the client is ended.

Steps 620, 630, 640 and 645 may be carried out, or controlled, by the sleep coordination function 225 of the data broker 200.

In response to receiving the awake indication, the data broker transmits the data received at step 625 to the client. In some examples, the data broker transmits data which has been previously received and (for example, at step 635) buffered. The data broker 200 may transmit a sequence of buffered data to the client device 100.

Subsequently, at step 655, the data broker transmits a return to sleep indication to the client, to indicate that the data broker has stopped transmitting data to the client. The PING RESP control packet 452 described above is an example of the return to sleep indication. This step may be performed when all data which has been buffered for the client has been transmitted.

The process of FIG. 6 may be repeated, starting again from step 615 or step 620. In some examples, data is received (at step 625) and is transmitted (at step 650) while the client is not associated with the sleep state.

In some examples, the awake indication is received (step 645) when the data broker has not determined that the client device 100 should leave the sleep state. In such a case, step 650 may be omitted if there is no buffered data for the client device 100. Step 655 is then omitted.

In some examples, neither step 640 nor step 645 occur before the sleep state end time. In some such examples where the indication of the sleep state end time received at step 620 comprises, or is comprised within, a control packet having a keep-alive function, it may be determined that the connection, established at step 610 is terminated.

Figure 7:
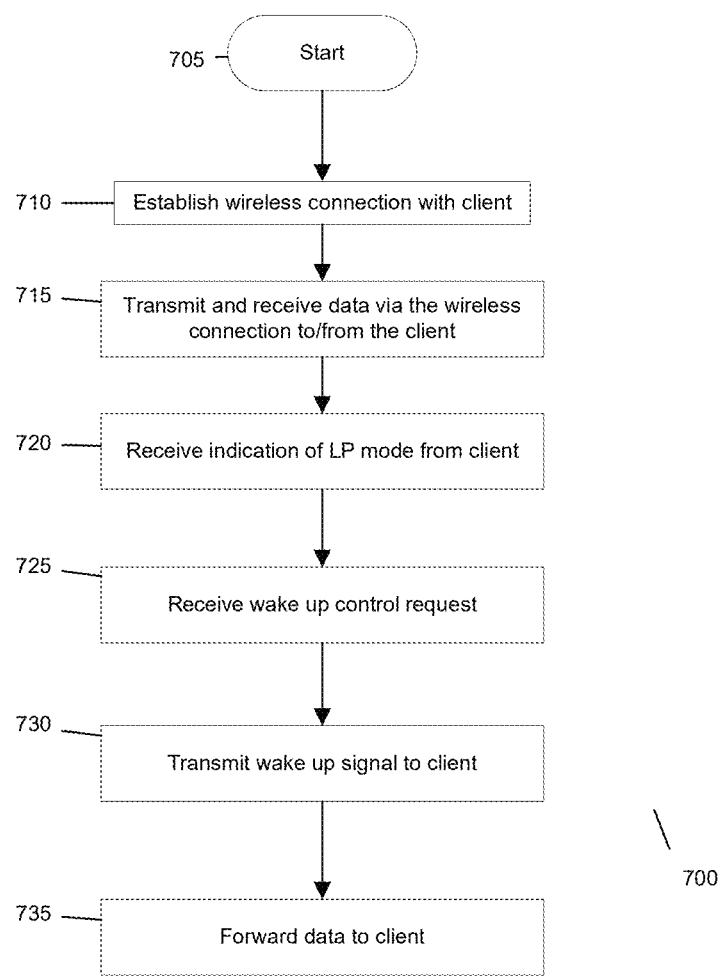
FIG. 7 is a flow chart illustrating a method carried out at a wireless communications network in accordance with examples.

FIG. 7 is a flow chart illustrating a method 700 carried out at a wireless communications network, such as the wireless communications network 190 of FIG. 1, in accordance with examples.

The process starts at step 705. Control initially passes to step 710 in which a connection, via a wireless communications link (such as the wireless communications link 150 of FIG. 1), is established with the client device 100. This may be in accordance with the procedure for establishing the wireless connection specified in a standard applicable to the wireless connection. This establishment may be carried out by the radio access network 192 communicating with the network interface 110 of the client device 100. The radio access network 192 may comprise a processor, memory, wireless network interface for communicating via the wireless communications link with the client device 100 and network interface for communicating with the network controller 195. The network controller 195 may comprise a processor, memory and one or more network interfaces and may implement non-access stratum (NAS) and core network functions of the wireless communications network 190, in accordance with relevant specifications, such as those developed by 3GPP. The network interface 110 of the client device 100 may establish a NAS connection with the network controller 195. Accordingly, the wireless communications network 190 may be configured to receive and transmit data to and from the client device 100, via the wireless communications link 150 and to and from external entities, such as the data broker 200.

The wireless communications network may transmit an indication to the data broker 200 that it has established a connection with the client device 100. The wireless communications network may transmit an indication to the data broker 200 that the connection with the client device 100 supports a low power mode of operation. These indications may be direct or via a suitable proxy.

The process continues with step 715 in which wireless data is transmitted to and from the client device 100, via the wireless communications link 150. The wireless data may be MQTT message data and/or control packets which are received from or transmitted to (e.g., via the communications link 250) the data broker 200. The wireless communications network 190 forwards the data and control packets transparently. The data and control packets may be in the form of internet protocol (IP) packets which, for the transmission via the wireless communications link 150, may be segmented, formed into frames or transport blocks, encoded and modulated onto one or more suitable radio frequency carriers. An IP packet may comprise a transmission control protocol (TCP) control packet or user datagram protocol (UDP) control packet or MQTT control packets which is encapsulated in a TCP/IP or UDP/IP packet.

Initially, (e.g., during step 715) the communications link 150 may be operated in a mode which is not the low power mode and which is associated with particular requirements on the client device 100 for monitoring certain downlink transmissions (i.e., transmissions by the wireless communications network 190 to the client device 100), and attempting to decode signals received to determine whether they comprise messages or other communications destined for the client device 100. Accordingly, the wireless communications network 190 schedules transmissions to or from the client in accordance with the requirements on the client device 100 when it is not in the low power mode.

At step 720, the wireless communications network receives from the client device 100 a request for the client to enter the low power mode. The request may be a low power mode request signal 428, comprising an indication of the low power mode end time, as described above in the context of FIG. 5 and FIG. 2.

In response to receiving the request, the wireless communications network 190 may determine parameters for the operation of the low power mode. These may be based on the low power mode end time and may define start and end times of the low power mode period 432, including any sub-periods thereof. The parameters may define requirements for the monitoring of downlink signals that apply to the client while operating in the low power mode. For example, they may define a periodic series of occasions or time periods during which the client must monitor certain downlink signals. During these occasions or time periods, the client may be considered to still be within the low power mode or (as in the example of FIG. 4C) may temporarily leave the low power mode.

The wireless communications network 190 may transmit an acknowledgement of the request, such as the wireless network acknowledgement 430 of FIG. 2. The acknowledgement may indicate the determined parameters. The acknowledgement may indicate whether the low power mode end time is to be the same as that indicated in the request.

The wireless communications network 190 then associates the client device 100 with the low power mode and schedules (or refrains from scheduling) subsequent transmissions accordingly. In particular, it may refrain from transmitting wireless data to the client when, according to the requirements for the monitoring of downlink signals when in the low power mode, the client is not required to monitor downlink transmissions.

At step 725, the wireless communications network receives a wake up control request transmitted by the data broker 200. The wake up control request is directed to the wireless communications network 190 and may be transmitted by means of a separate logical connection between the data broker 200 and the wireless communications network 190. For example, a control plane connection between the data broker 200 and the wireless communications network 190 using SS7 or a similar suitable telephony control signalling protocol may be used for the transmission of the wake up control request. The wireless communications network 190 may provide an application programming interface (API) for the purposes of receiving wake up control requests. The wake up control request is not forwarded transparently to the client device 100.

In response to receiving the wake up control request, control passes to step 730, in which the wireless communications network transmits a wake up signal (WUS) to the client device, to indicate that the client device is no longer considered to be in the low power mode, and that the requirements for the mode which is not the low power mode apply.

In some examples, wireless communications network 190 receives a wake up indication in respect of the client device 100. In response to receiving the wake up indication, the wireless communications network transmits the WUS to the client device 100. The wireless communications network 190 forwards the wake up indication to the client device 100; the wake up indication may be transmitted together with the WUS (e.g., so that both the wake up indication and the WUS are within a single transmission on the wireless communications link 150) or may be transmitted after the WUS has been transmitted and the client device 100 has left the low power mode.

The process continues with step 735 in which the wireless communications network 190 transmits wireless data to and from the client device 100. The wireless data may comprise data 448, 450 shown in FIG. 2, transmitted by the data broker 200 to the client in accordance with the subscription of the MQTT client 120.

Control then returns to step 715, and the process repeats until the wireless communications link 150 is released.

It will be appreciated that the processes shown in FIG. 5, FIG. 6 and FIG. 7 are by way of example, and that the scope of the present disclosure is not so limited. In particular, the processes may include additional steps which are not shown. In some examples, one or more of the steps is omitted. In some examples, the steps are performed in a different order. For example, referring to FIG. 5, in some examples, steps 510 and 515 are omitted, and the duration of the sleep state period 422 (or the sleep state end time) is not determined before the start of the sleep state period 422. Similarly, in some examples, step 530 is omitted, and the duration of the low power mode period 432 (or the low power mode end time) is not determined before the start of the low power mode period 432.

In some examples, one or both of steps 545 and 560 are omitted and the low power mode period 432 (respectively, sleep state period 422) ends only at the end of the respective period as determined at, or prior to, the start of the respective period.

The figures and description above refer to the use of MQTT or MQTT-SN; however the present disclosure is not so limited, and any other suitable messaging protocol may be used. In some examples, the client device 100 and data broker 200 implement any suitable publish/subscribe messaging protocol. Accordingly, in some examples, the sleep state is a mode of operation according to the messaging protocol which allows the client device to reduce its power consumption. In some examples, the use of the sleep state is coordinated with the data broker; that is, the data broker operates in a different manner when the client is in the sleep state.

In the examples above, data sent using the messaging protocol is sent via the same wireless communications network that sends the WUS. In some examples, the WUS may be sent via a different communications network; for example, data (such as control packets sent between the MQTT client 120 and the MQTT server 220) may be sent via a cellular communications network, and the WUS may be transmitted using a wireless local area network (e.g. based on an IEEE 802.11 standard) or short-range wireless communications link (e.g. based on a Zigbee or Bluetooth standard).

It will be appreciated that the specific messages and indications described herein are for illustration only, and that the scope of the present disclosure is not limited to these specific sequences of messages and indications. For example, in some embodiments, one or more of the messages and indications shown in FIG. 2 or FIG. 3 are omitted, and in some examples, their order is changed. In some examples, additional messages and indications are transmitted.

In the example of FIG. 1, the wireless communications network 190 and the data broker 200 are shown as separate and discrete functions. In some examples, the data broker 200 is provided as part of the wireless communications network 190.

In the examples of FIG. 1 and FIG. 2, the client device 100 is shown as comprising an API 135, application 130 and sensor 140. However, the present disclosure is not so limited, and it will be appreciated that in some examples, one or more of these functions is not present, and in some examples the client device 100 may comprise additional functions. In a particular example, the client device 100 does not comprise a sensor 140. In some examples, the client device 100 does not generate data which is published to the data broker 200. In some examples, the network interface 110 and MQTT client 120 are combined. In some examples, functions of the client device 100 described above are implemented in multiple devices which are communicatively coupled.

Figure 8:
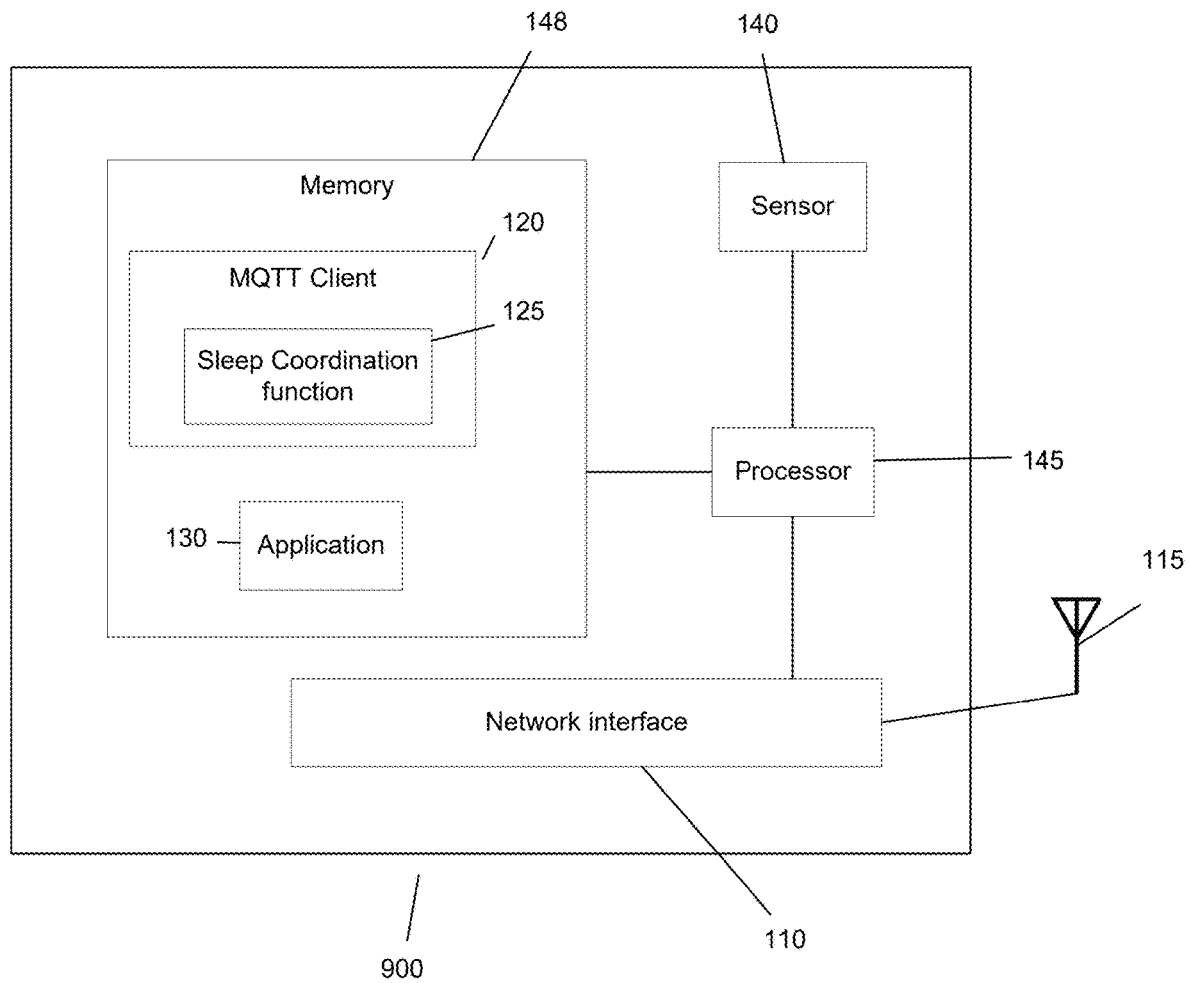
FIG. 8 is a simplified block diagram of a client device in accordance with examples.

FIG. 8 is a simplified block diagram of a device 900 in accordance with examples. The device 900 may be provided to implement the client device 100 as shown in FIG. 1. As shown, the device 900 includes processor 145, memory 148 and network interface 110, the memory 148 and network interface 110 coupled to the processor 145. The network interface 110 is for bidirectional communication and is coupled to antenna 115. The memory 148 may comprise a storage medium on which is stored a computer program in accordance with examples described herein. In the example of FIG. 8, the memory comprises instructions which when executed by the processor 145, cause the device 900 to perform the application 130, MQTT client 120, and sleep coordination function 125. Device 900 comprises sensor 140, which is coupled to the processor 145. It will be appreciated that in some examples, the device 900 does not include a sensor.

The processor 145 may be of any type suitable and may include general purpose computers, application-specific integrated circuits, as non-limiting examples. In some examples, the device 900 may have multiple processors.

Figure 9:
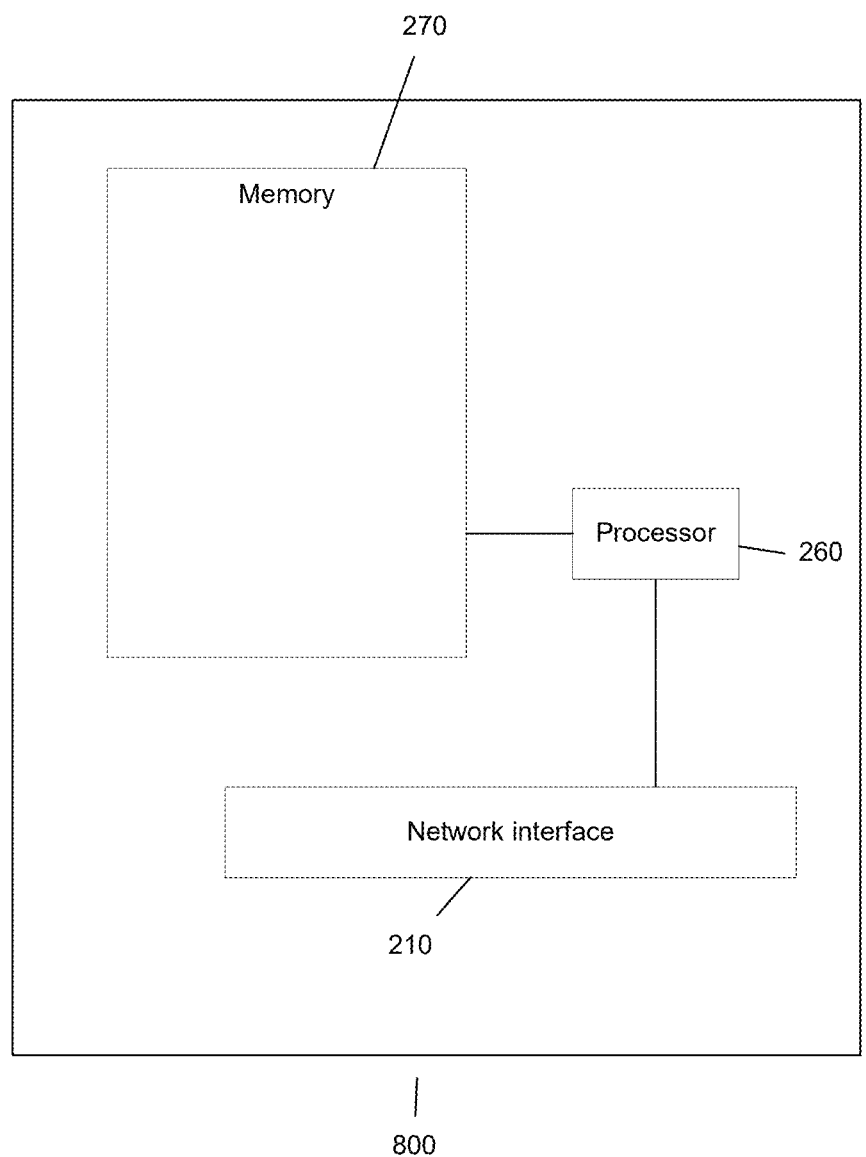
FIG. 9 is a simplified block diagram of a device, such as a data broker device or wireless communications network controller device, in accordance with examples.

FIG. 9 is a simplified block diagram of a device 800 in accordance with examples. The device 800 may be provided to implement the data broker 200 as shown in FIG. 1. As shown, the device 800 includes processor 260, memory 270 and network interface 210, the memory 270 and network interface 210 coupled to the processor 260. The network interface 210 is for bidirectional communication. For example, when implementing the data broker 200, the network interface may provide for communication with the network controller 195 of the wireless communications network 190. When implementing the network controller 195, the network interface 210 may provide for communication with the data broker 200 and radio access network 192. In some examples, the device 800 comprises multiple network interfaces including one or more network interfaces for communicating externally to the wireless communications network 190, and one or more network interfaces for communicating within the wireless communications network 190 (e.g. to the radio access network 192).

The memory 270 may comprise a storage medium on which is stored a computer program in accordance with examples described herein. In the example of FIG. 9, when implementing the data broker 200, the memory comprises instructions, which, when executed by the device 800 cause the device 800 to perform the functions of the MQTT server 220 and sleep coordination function 225. When implementing the network controller 195, the memory comprises instructions, which, when executed by the device 800 cause the device 800 to control the wireless communications network to perform the processes described out above, such as those shown in FIG. 7.

The processor 260 may be of any type suitable and may include general purpose computers, application-specific integrated circuits, as non-limiting examples. In some examples, the device 800 may have multiple processors.

In some examples, the data broker 200 may be implemented using a plurality of devices 800 in a distributed architecture, in which the plurality of devices 800 cooperate. Similarly, in some examples, the network controller 195 is implemented using a plurality of devices 800 in a distributed architecture, in which the plurality of devices 800 cooperate.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The following numbered paragraphs and clauses provide further example aspects and features of the present technique.

Clause 1. A method comprising:
transmitting by a publish/subscribe messaging client, in accordance with a publish/subscribe messaging protocol, a subscribe request to a data broker requesting the data broker to transmit data to the client,
transmitting by the client to the data broker, via a wireless communications link, a sleep indication, the sleep indication indicating that the client is entering a sleep state until a first time and requesting that, while the client is in the sleep state, the data broker is to buffer the data for the client,
transmitting by the client a low power mode request to operate the wireless communications link in a low power mode until a second time, wherein the first time and the second time are substantially aligned,
entering the sleep state and the low power mode,
while in the sleep state, receiving at the client, a wake-up indication via the wireless communications link,
in response to receiving the wake-up indication, entering an awake state of the publish/subscribe messaging protocol in which the client is configured to receive data from the data broker, and
while in the awake state, receiving the data from the data broker via the wireless communications link.

Clause 2. A method at a client of a publish/subscribe messaging system, the method comprising
transmitting by the client, in accordance with a publish/subscribe messaging protocol, a subscribe request to a data broker requesting the data broker to transmit data to the client,
entering a first mode of operation in which, according to the publish/subscribe messaging protocol, the data broker is to buffer the data for the client,
while in the first mode of operation, receiving a wake-up indication via a wireless communications link,
in response to receiving the wake-up indication, entering a second mode of operation in which, according to the publish/subscribe messaging protocol, the client is configured to receive data from the data broker, and
while in the second mode of operation, receiving the data from the data broker.

Clause 3. A method according to clause 2, wherein
the wireless communication link is operated in accordance with a wireless communications standard,
the wake-up indication is received while the client is operating the wireless communication link in a low power mode in accordance with the wireless communications standard, and
the wake-up indication is defined by the wireless communications standard.

Clause 4. A method according to clause 2, wherein the wireless communications standard is one of a 3GPP narrow band internet of things (NB-IoT) standard, a 3GPP long term evolution-machine type communication (LTE-M) standard, or a 3GPP 5G/NR standard.

Clause 5. A method according to clause 3 or clause 4, wherein the wake-up indication comprises a paging signal transmitted on a physical downlink shared channel.

Clause 6. A method according to any of clauses 3 to 5, wherein the low power mode is one of a low power sleep mode of an enhanced discontinuous reception (eDRX) or a power saving mode (PSM).

Clause 7. A method according to clause 2, wherein the wake-up indication is sent from the data broker to the client.

Clause 8. A method according to any of clauses 2 to 7, the method comprising:
in response to receiving the wake-up indication, transmitting an awake indication to the broker to indicate that the client is configured to receive data from the data broker.

Clause 9. A method according to clause 8, wherein the awake indication comprises a keep alive request packet.

Clause 10. A method according to any of clauses 2 to 9, wherein
the publish/subscribe messaging protocol is an MQTT sensor networks (SN) protocol,
the first mode of operation is an MQTT-SN ASLEEP state, and the second mode of operation is an MQTT-SN AWAKE state.

Clause 11. A method at a client of a publish/subscribe messaging system comprising
 transmitting, in accordance with a publish/subscribe protocol and via a wireless communications link, a sleep indication, the sleep indication indicating that the client is entering a sleep state of the publish/subscribe protocol and requesting the data broker to buffer data for the client until a first time, and
 transmitting a low power mode request to operate the wireless communications link in a low power mode until a second time, wherein the first time and the second time are substantially aligned.

Clause 12. A method according to clause 11, the method comprising:
 entering the sleep state and, while in the sleep state, operating the wireless communications link in the low power mode.

Clause 13. A method according to clause 11 or clause 12, the method comprising:
 after the first time and the second time,
 transmitting via the wireless communications link a further sleep indication, the further sleep indication indicating that the client is entering the sleep state until a third time, and
 transmitting a further low power mode request to operate the wireless communications link in the low power mode until a fourth time, the third time and the fourth time being substantially aligned.

Clause 14. A method comprising:
 receiving at a publish/subscribe messaging broker, in accordance with a publish/subscribe messaging protocol, a subscribe request from a publish/subscribe messaging client requesting the data broker to transmit data to the client,
 receiving by the data broker from client a sleep indication, the sleep indication indicating that the client is entering a sleep state until a first time and requesting that, while the client is in the sleep state, the data broker is to buffer the data for the client,
 determining that data is to be transmitted to the client and that the client is in the sleep state,
 transmitting to the client a wake-up indication,
 determining that the client is in an awake state of the publish/subscribe messaging protocol in which the client is configured to receive data from the data broker, and
 transmitting the data from the data broker to the client.

Clause 15. A method at a data broker of a publish/subscribe messaging system, the method comprising
 receiving from a client in the publish/subscribe messaging system, in accordance with a publish/subscribe messaging protocol, a subscribe request requesting the data broker to transmit data to the client,
 determining that data is to be transmitted to the client and that the client is in a first mode of operation in which, according to the publish/subscribe messaging protocol, the data broker is to buffer the data for the client,
 transmitting a wake-up indication or a wake-up control request,
 determining that the client is in a second mode of operation in which, according to the publish/subscribe messaging protocol, the client is configured to receive data from the data broker, and
 transmitting the data to the client.

Clause 16. A method according to clause 15, wherein
 the subscribe request is received via a wireless communication link operated between the client and a wireless communications network and is operated in accordance with a wireless communications standard,
 the wake-up control request is transmitted to a control node within the wireless communications network to request the transmission, to the client, of a wake-up indication defined by the wireless communications standard.

Clause 17. A method according to clause 15, wherein the wake-up indication is sent from the data broker to the client.

Clause 18. A method at a wireless communications network, the method comprising
 determining that a device connected, via a wireless communications link operated in accordance with a wireless communications standard, to the wireless communications network is operating in a low power mode defined by the wireless communication standard,
 receiving a wake-up control request,
 in response to receiving the wake-up control request, transmitting a wake-up indication defined by the wireless communication standard via the wireless communications link to the device.

Clause 19. An apparatus, comprising:
 a network interface,
 a processor, and
 a memory, the memory having stored upon it instructions which, when executed, cause the apparatus to carry out the method of any of clauses 1 to 18.

Paragraph 1. A method comprising:
 transmitting by a client device in a publish/subscribe messaging system, in accordance with a publish/subscribe messaging protocol, a subscribe request to a data broker requesting the data broker to transmit data to the client device,
 transmitting, by the client device to the data broker, a sleep indication, the sleep indication indicating that a messaging client of the client device is entering a sleep state until a sleep state end time and requesting that, while the messaging client is in the sleep state, the data broker is to refrain from sending the data to the client device, and
 transmitting, by a network interface of the client device via a wireless communications link, a low power mode request signal for requesting to operate the network interface in a low power mode until a low power mode end time, wherein the sleep state end time and the low power mode end time are substantially aligned.

Paragraph 2. A method according to paragraph 1, wherein the publish/subscribe messaging protocol is an MQTT sensor networks (SN) protocol, and the sleep state is an MQTT-SN ASLEEP state.

Paragraph 3. A method according to paragraph 1 or paragraph 2, wherein the sleep indication is transmitted via the network interface of the client device and a wireless communications link.

Paragraph 4. A method according to any of paragraphs 1 to 3, the method comprising determining, by a sleep coordination function of the client device, the low power mode end time based on the sleep state end time.

Paragraph 5. A method according to any of paragraphs 1 to 4, the method comprising:
 entering the sleep state at the messaging client, wherein in the sleep state the messaging client is not operable to receive message data from the data broker,
 entering the low power mode at the network interface of the client device, while the messaging client is in the sleep state, receiving at the network interface a wake up signal, in response to receiving the wake up signal, leaving the low power mode at the network interface, after receiving the wake up signal, entering at the messaging client an awake state of the publish/subscribe messaging protocol in which the messaging client is configured to receive data from the data broker, and while in the awake state and after leaving the low power mode, receiving at the messaging client the data from the data broker via the wireless communications link.

Paragraph 6. A method according to paragraph 5, wherein the awake state is an MQTT-SN AWAKE state.

Paragraph 7. A method according to paragraph 5 or paragraph 6, wherein the wireless communication link is operated in accordance with a wireless communications standard, the wake up signal is received while the client is operating the wireless communication link in the low power mode in accordance with the wireless communications standard, the wake up signal is defined by the wireless communications standard, and the entering at the messaging client the awake state of the publish/subscribe messaging protocol is in response to receiving the wake up signal.

Paragraph 8. A method according to paragraph 7, wherein the wireless communications standard is one of a 3GPP narrow band internet of things (NB-IoT) standard, a 3GPP long term evolution-machine type communication (LTE-M) standard, or a 3GPP 5G/NR standard.

Paragraph 9. A method according to paragraph 7 or paragraph 8, wherein the wake up signal comprises a paging signal transmitted on a physical downlink shared channel.

Paragraph 10. A method according to any of paragraphs 7 to 9, wherein the low power mode is one of a low power sleep mode of an enhanced discontinuous reception (eDRX) or a power saving mode (PSM).

Paragraph 11. A method according to paragraph 5 or paragraph 6, the method comprising:

receiving a wake up indication sent from the data broker to the client device, wherein the entering at the messaging client the awake state of the publish/subscribe messaging protocol is in response to receiving the wake up indication.

Paragraph 12. A method according to paragraph 11, wherein the wake up signal is received together with the wake up indication.

Paragraph 13. A method according to any of paragraphs 5 to 12, the method comprising:

transmitting an awake indication to the data broker to indicate that the messaging client of the client device is configured to receive data from the data broker.

Paragraph 14. A method according to paragraph 13, wherein the awake indication comprises a keep alive request packet.

Paragraph 15. A method comprising:

transmitting by a messaging client of a client device, in accordance with a publish/subscribe messaging protocol, a subscribe request to a data broker requesting the data broker to transmit data to the messaging client, transmitting by the messaging client to the data broker, via a network interface of the client device and a wireless communications link, a sleep indication, the sleep indication indicating that the messaging client is entering a sleep state until a sleep state end time and requesting that, while the messaging client is in the sleep state, the data broker is to refrain from sending the data for the messaging client, transmitting to the network interface a network interface low power mode request to operate the wireless communications link in a low power mode until an initial low power mode end time, wherein the sleep state end time and the initial low power mode end time are substantially aligned, and entering the sleep state at the messaging client.

Paragraph 16. A method according to paragraph 15, wherein the publish/subscribe messaging protocol is an MQTT sensor networks (SN) protocol, and the sleep state is an MQTT-SN ASLEEP state.

Paragraph 17. A method according to paragraph 15 or paragraph 16, the method comprising:

determining, by a sleep coordination function of the messaging client, the initial low power mode end time based on the sleep state end time.

Paragraph 18. A method according to any of paragraphs 15 to 17, the method comprising:

while in the sleep state, receiving from the network interface a wake up indication, in response to receiving the wake up indication, entering at the messaging client an awake state of the publish/subscribe messaging protocol in which the messaging client is configured to receive data from the data broker, and while in the awake state, receiving at the messaging client the data from the data broker.

Paragraph 19. A method according to paragraph 18, wherein the awake state is an MQTT-SN AWAKE state.

Paragraph 20. A method according to paragraph 18 or paragraph 19, wherein the wake up indication is generated at the network interface.

Paragraph 21. A method according to paragraph 18 or paragraph 19, wherein the wake up indication is sent from the data broker to the messaging client.

Paragraph 22. A method according to any of paragraphs 18 to 21, the method comprising:

in response to receiving the wake up indication, transmitting an awake indication to the data broker to indicate that the messaging client is configured to receive data from the data broker.

Paragraph 23. A method according to paragraph 22, wherein the awake indication comprises a keep alive request packet.

Paragraph 24. An apparatus, comprising:

a network interface, a processor, and a memory, the memory having stored upon it instructions which, when executed, cause the apparatus to carry out the method of any of paragraphs 1 to 23.

Paragraph 25. A computer readable medium having stored upon it instructions which, when executed by a processor of a client device, cause the client device to carry out the method of any of paragraphs 1 to 23.

Paragraph 26. A computer program product comprising processor-executable instructions for implementing a client device of a publish/subscribe messaging system, the processor-executable instructions comprising instructions that, when executed by a processor of the client device, cause the client device to carry out the method of any of paragraphs 1 to 14.

Paragraph 27. A computer program product comprising processor-executable instructions for implementing a messaging client of a publish/subscribe messaging system within a client device, the processor-executable instructions comprising instructions that, when executed by a processor of the client device, cause the client device to carry out the method of any of paragraphs 15 to 23.

Paragraph 28. A method comprising:
transmitting by a client device in a publish/subscribe messaging system, in accordance with a publish/subscribe messaging protocol, a subscribe request to a data broker requesting the data broker to transmit data to the client device,
entering a sleep state at a messaging client of the client device, wherein in the sleep state the messaging client is not operable to receive data from the data broker,
entering a low power mode at a network interface of the client device,
while the messaging client is in the sleep state, receiving at the network interface a wake up signal,
in response to receiving the wake up signal, leaving the low power mode at the network interface,
after receiving the wake up signal, entering at the messaging client an awake state of the publish/subscribe messaging protocol in which the messaging client is configured to receive data from the data broker, and
while in the awake state and after leaving the low power mode, receiving at the messaging client the data from the data broker via the wireless communications link.

Paragraph 29. A method according to paragraph 28, the method comprising:
transmitting, by the client device to the data broker via the network interface, a sleep indication, the sleep indication indicating that the messaging client of the client device is entering the sleep state until a sleep state end time and requesting that, while the messaging client is in the sleep state, the data broker is to refrain from sending the data to the client device.

Paragraph 30. A method according to paragraph 28 or paragraph 29, wherein
the wake up signal is received via a wireless communication link operated in accordance with a wireless communications standard,
the wake up signal is defined by the wireless communications standard, and the entering at the messaging client the awake state of the publish/subscribe messaging protocol is in response to receiving the wake up signal.

Paragraph 31. A method according to paragraph 30, wherein the wireless communications standard is one of a 3GPP narrow band internet of things (NB-IoT) standard, a 3GPP long term evolution-machine type communication (LTE-M) standard, or a 3GPP 5G/NR standard.

Paragraph 32. A method according to paragraph 30 or paragraph 31, wherein the wake up signal comprises a paging signal transmitted on a physical downlink shared channel.

Paragraph 33. A method according to any of paragraphs 30 to 32, wherein the low power mode is one of a low power sleep mode of an enhanced discontinuous reception (eDRX) or a power saving mode (PSM).

Paragraph 34. A method according to paragraph 28 or paragraph 29, the method comprising:
receiving a wake up indication sent from the data broker to the client, wherein the entering at the messaging client the awake state of the publish/subscribe messaging protocol is in response to receiving the wake up indication.

Paragraph 35. A method according to paragraph 34, wherein the wake up signal is received together with the wake up indication.

Paragraph 36. A method according to any of paragraphs 28 to 35, the method comprising:
transmitting an awake indication to the broker to indicate that the messaging client is configured to receive data from the data broker.

Paragraph 37. A method according to paragraph 36, wherein the awake indication comprises a keep alive request packet.

Paragraph 38. A method according to any of paragraphs 28 to 37, wherein
the publish/subscribe messaging protocol is an MQTT sensor networks (SN) protocol,
the sleep state is an MQTT-SN ASLEEP state, and
the awake state is an MQTT-SN AWAKE state.

Paragraph 39. A method at a messaging client of a publish/subscribe messaging system within a client device, the method comprising:
transmitting a subscribe request in accordance with a publish/subscribe messaging protocol of the publish/subscribe messaging system to a data broker requesting the data broker to transmit message data to the messaging client;
entering a sleep state, wherein in the sleep state the messaging client is not operable to receive message data from the data broker,
while the messaging client is in the sleep state, receiving a wake up indication,
in response to receiving the wake up indication, entering an awake state of the publish/subscribe messaging protocol in which the messaging client is configured to receive data from the data broker, and
while in the awake state, receiving at the messaging client the data from the data broker.

Paragraph 40. A method according to paragraph 39, the method comprising:
transmitting, to the data broker, a sleep indication indicating that the messaging client of the client device is entering a sleep state until a sleep state end time and requesting that, while the messaging client is in the sleep state, the data broker is to refrain from sending the data to the client device, Paragraph 41. A method according to paragraph 39 or paragraph 40, wherein
the wake up indication is generated at the client device in response to receiving, at a network interface of the client device, a wake up signal.

Paragraph 42. A method according to paragraph 39 or paragraph 40, wherein
the wake up indication is sent from the data broker to the client device.

Paragraph 43. A method according to any of paragraphs 39 to 42, the method comprising:
in response to receiving the wake up indication, transmitting an awake indication to the data broker to indicate that the messaging client is configured to receive data from the data broker.

Paragraph 44. A method according to paragraph 43, wherein the awake indication comprises a keep alive request packet.

Paragraph 45. A method according to any of paragraphs 39 to 44, wherein
the publish/subscribe messaging protocol is an MQTT sensor networks (SN) protocol,
the sleep state is an MQTT-SN ASLEEP state, and
the awake state is an MQTT-SN AWAKE state.

Paragraph 46. An apparatus, comprising:
a network interface,
a processor, and
a memory, the memory having stored upon it instructions which, when executed, cause the apparatus to carry out the method of any of paragraphs 28 to 45.

Paragraph 47. A computer readable medium having stored upon it instructions which, when executed by a processor of a client device, cause the client device to carry out the method of any of paragraphs 28 to 45.

Paragraph 48. A computer program product comprising processor-executable instructions for implementing a client device of a publish/subscribe messaging system, the processor-executable instructions comprising instructions that, when executed by a processor of the client device, cause the client device to carry out the method of any of paragraphs 28 to 38.

Paragraph 49. A computer program product comprising processor-executable instructions for implementing a messaging client of a publish/subscribe messaging system within a client device, the processor-executable instructions comprising instructions that, when executed by a processor of the client device, cause the client device to carry out the method of any of paragraphs 39 to 45.

Paragraph 50. A method at a wireless communications network, the method comprising
determining that a client device connected, via a wireless communications link operated in accordance with a wireless communications standard, to the wireless communications network is operating in a low power mode defined by the wireless communication standard,
receiving a wake up control request,
in response to receiving the wake up control request, transmitting a wake up signal defined by the wireless communication standard via the wireless communications link to the client device.

Paragraph 51. A method according to paragraph 50, wherein the wireless communications standard is one of a 3GPP narrow band internet of things (NB-IoT) standard, a 3GPP long term evolution-machine type communication (LTE-M) standard, or a 3GPP 5G/NR standard.

Paragraph 52. A method according to paragraph 50 or paragraph 51, wherein the wake up signal comprises a paging signal transmitted on a physical downlink shared channel.

Paragraph 53. A method according to any of paragraphs 50 to 52, wherein the wake up control request is received from a data broker, the client device and the data broker communicating via the wireless communications network in accordance with a publish/subscribe messaging protocol.

Paragraph 54. A method according to any of paragraphs 50 to 53, the method comprising:
transmitting, together with the wake up signal defined by the wireless communication standard, a wake up indication defined by a publish/subscribe messaging protocol for requesting a messaging client to leave a sleep state of the publish/subscribe messaging protocol.

Paragraph 55. A method according to paragraph 53 or paragraph 54, wherein the publish/subscribe messaging protocol is an MQTT sensor networks (MQTT-SN) protocol.

Paragraph 56. An apparatus, comprising:
a wireless network interface,
a processor, and
a memory, the memory having stored upon it instructions which, when executed, cause the apparatus to carry out the method of any of paragraphs 50 to 55.

Paragraph 57. A computer readable medium having stored upon it instructions which, when executed by a processor of a wireless communications network, cause the wireless communications network to carry out the method of any of paragraphs 50 to 55.

Paragraph 58. A computer program product comprising processor-executable instructions for implementing a client device of a publish/subscribe messaging system, the processor-executable instructions comprising instructions that, when executed by a processor of the wireless communications network, cause the wireless communications network to carry out the method of any of paragraphs 50 to 55.

Paragraph 59. A method at a data broker of a publish/subscribe messaging system, the method comprising:
receiving from a messaging client in the publish/subscribe messaging system, in accordance with a publish/subscribe messaging protocol, a subscribe request requesting the data broker to transmit data to the messaging client,
determining that data within the scope of the subscribe request is to be transmitted to the messaging client and that the messaging client is in a sleep state in which, according to the publish/subscribe messaging protocol, the data broker is to refrain from transmitting data to the messaging client,
transmitting a wake up indication or a wake up control request,
determining that the messaging client is in an awake state in which, according to the publish/subscribe messaging protocol, the messaging client is configured to receive data from the data broker, and
transmitting the data to the messaging client.

Paragraph 60. A method according to paragraph 59, the method comprising:
after receiving the subscribe request, and before determining that the data is to be transmitted, receiving by the data broker a sleep indication, the sleep indication transmitted by the messaging client, indicating that the messaging client is entering the sleep state of the publish/subscribe messaging protocol until a sleep state end time,
wherein the determining that the messaging client is in the sleep state is based on the sleep indication.

Paragraph 61. A method according to paragraph 59 or paragraph 60, wherein the messaging client is within a client device, and the wake up control request is transmitted to a wireless communications network for requesting the transmission of a wake up signal to the client device.

Paragraph 62. A method according to paragraph 61, wherein
the data broker communicates with the client device via a wireless link provided by the wireless communications network,
the wireless link is operated in accordance with a wireless communications standard,
the wake up signal comprises a paging signal transmitted on a physical downlink shared channel of the wireless communication link, and the wireless communications standard is one of a 3GPP narrow band internet of things (NB-IoT) standard, a 3GPP long term evolution-machine type communication (LTE-M) standard, or a 3GPP 5G/NR standard.

Paragraph 63. A method according to any of paragraphs 59 to 62, the method comprising:
after transmitting the wake up indication or the wake up control request, receiving an awake indication indicating that the messaging client is configured to receive data from the data broker.

Paragraph 64. A method according to paragraph 63, wherein the awake indication comprises a keep alive request packet.

Paragraph 65. A method according to any of paragraphs 59 to 64, the method comprising:
receiving the data within the scope of the subscribe request,
determining that the data within the scope of the subscribe request is to be transmitted to the messaging client, wherein
transmitting the wake up indication or the wake up control request is in response to determining that the data within the scope of the subscribe request is to be transmitted to the messaging client.

Paragraph 66. A method according to any of paragraphs 59 to 65, the method comprising:
receiving other data within the scope of the subscribe request,
determining that the other data within the scope of the subscribe request is not to be transmitted to the messaging client.

Paragraph 67. A method according to any of paragraphs 59 to 66, wherein
the publish/subscribe messaging protocol is an MQTT sensor networks (SN) protocol,
the sleep state is an MQTT-SN ASLEEP state, and
the awake state is an MQTT-SN AWAKE state.

Paragraph 68. An apparatus, comprising:
a network interface,
a processor, and
a memory, the memory having stored upon it instructions which, when executed, cause the apparatus to carry out the method of any of paragraphs 59 to 67.

Paragraph 69. A computer readable medium having stored upon it instructions which, when executed by a processor of a data broker, cause the data broker to carry out the method of any of paragraphs 59 to 67.

Paragraph 70. A computer program product comprising processor-executable instructions for implementing a data broker of a publish/subscribe messaging system, the processor-executable instructions comprising instructions that, when executed by a processor of the data broker, cause the data broker to carry out the method of any of paragraphs 59 to 67.

Paragraph 71. A method at a wireless network interface of a client device in a publish/subscribe messaging system, the method comprising:
operating a wireless communications link in a low power mode in accordance with a wireless communication standard,
while operating the wireless communications link in the low power mode, receiving a wake up signal defined by the wireless communication standard via the wireless communications link, and
in response to receiving the wake up signal defined by the wireless communication standard, leaving the low power mode and sending a wake up indication to a messaging client in the client device for requesting the messaging client to leave a sleep state of a publish/subscribe messaging protocol.

Paragraph 72. A method according to paragraph 71, the method comprising:
transmitting, via the wireless communications link, a low power mode request signal for requesting to operate the wireless communications link in the low power mode.

Paragraph 73. A method according to paragraph 72, wherein the low power mode request signal comprises an indication of a low power mode end time.

Paragraph 74. A method according to any of paragraphs 71 to 73, the method comprising:
before entering the low power mode of operation, receiving from the messaging client a network interface low power mode request, the network interface low power mode request requesting to operate the network interface in a low power mode.

Paragraph 75. A method according to paragraph 74, wherein the network interface low power mode request comprises an indication of an initial low power mode end time, the method comprising:
determining, based on the initial low power mode end time, the low power mode end time.

Paragraph 76. A method according to any of paragraphs 71 to 75, wherein the wireless communications standard is one of a 3 GPP narrow band internet of things (NB-IoT) standard, a 3GPP long term evolution-machine type communication (LTE-M) standard, or a 3GPP 5G/NR standard.

Paragraph 77. A method according to any of paragraphs 71 to 76, wherein the wake up signal comprises a paging signal transmitted on a physical downlink shared channel.

Paragraph 78. A method according to any of paragraphs 71 to 77, wherein the low power mode is one of a low power sleep mode of an enhanced discontinuous reception (eDRX) or a power saving mode (PSM).

Paragraph 79. A method according to any of paragraphs 71 to 78, wherein the wake up indication is received via the wireless communications link together with the wake up signal.

Paragraph 80. A method according to any of paragraphs 71 to 79, wherein
the messaging client operates in accordance with a publish/subscribe messaging protocol,
the publish/subscribe messaging protocol is an MQTT sensor networks (SN) protocol, and
the sleep state is an MQTT-SN ASLEEP state.

Paragraph 81. A wireless network interface, comprising:
a processor, and
a memory, the memory having stored upon it instructions which, when executed, cause the wireless network interface to carry out the method of any one of paragraphs 71 to 80.

Paragraph 82. A computer readable medium having stored upon it instructions which, when executed by a processor of a wireless network interface, cause the wireless network interface to carry out the method of any of paragraphs 71 to 80.

Paragraph 83. A computer program product comprising processor-executable instructions for implementing a wireless network interface, the processor-executable instructions comprising instructions that, when executed by a processor of the wireless network interface, cause the wireless network interface to carry out the method of any of paragraphs 71 to 80.

Paragraph 84. A client device, comprising:
a wireless network interface,
a processor, and a memory, the memory having stored upon it
instructions which, when executed, cause the client device to implement a messaging client by carrying out the method of any one of paragraphs 15 to 23 and paragraphs 39 to 45, and
instructions which, when executed, cause the wireless network interface to carry out the method of any of paragraphs 71 to 80.

The invention claimed is:

1. A method comprising:
transmitting by a client device in a publish/subscribe messaging system, in accordance with a publish/subscribe messaging protocol, a subscribe request to a data broker requesting the data broker to transmit data to the client device,
transmitting, by the client device to the data broker, a sleep indication, the sleep indication indicating that a messaging client of the client device is entering a sleep state until a sleep state end time and requesting that, while the messaging client is in the sleep state, the data broker is to refrain from sending the data to the client device,
transmitting, by a network interface of the client device via a wireless communications link, a low power mode request signal for requesting to operate the network interface in a low power mode until a low power mode end time, wherein the sleep state end time and the low power mode end time are substantially aligned,
entering the sleep state at the messaging client, wherein in the sleep state the messaging client is not operable to receive message data from the data broker,
entering the low power mode at the network interface of the client device, wherein in the low power mode the network interface is capable of receiving a wake-up signal,
while the messaging client is in the sleep state, receiving at the network interface the wake up signal via the wireless communications link before the low power mode end time,
in response to receiving the wake up signal, leaving the low power mode at the network interface,
after receiving the wake up signal, entering at the messaging client an awake state of the publish/subscribe messaging protocol before the sleep state end time, wherein the messaging client is configured to receive data from the data broker in the awake state,
and
while in the awake state and after leaving the low power mode, receiving at the messaging client the data from the data broker via the wireless communications link.

2. A method according to claim 1, wherein the publish/subscribe messaging protocol is an MQTT sensor networks (SN) protocol, and the sleep state is an MQTT-SN ASLEEP state.

3. A method according to claim 1, wherein the sleep indication is transmitted via the network interface of the client device and a wireless communications link.

4. A method according to claim 1, the method comprising determining, by a sleep coordination function of the client device, the low power mode end time based on the sleep state end time.

5. A method according to claim 1, wherein the awake state is an MQTT-SN AWAKE state.

6. A method according to claim 1, wherein
the wireless communication link is operated in accordance with a wireless communications standard,
the wake up signal is received while the client is operating the wireless communication link in the low power mode in accordance with the wireless communications standard,
the wake up signal is defined by the wireless communications standard, and
the entering at the messaging client the awake state of the publish/subscribe messaging protocol is in response to receiving the wake up signal.

7. A method according to claim 6, wherein the wireless communications standard is one of a 3GPP narrow band internet of things (NB-IoT) standard, a 3GPP long term evolution-machine type communication (LTE-M) standard, or a 3GPP 5G/NR standard.

8. A method according to claim 6, wherein the wake up signal comprises a paging signal transmitted on a physical downlink shared channel.

9. A method according to claim 6, wherein the low power mode is one of a low power sleep mode of an enhanced discontinuous reception (eDRX) or a power saving mode (PSM).

10. A method according to claim 1, the method comprising:
receiving a wake up indication sent from the data broker to the client device, wherein the entering at the messaging client the awake state of the publish/subscribe messaging protocol is in response to receiving the wake up indication.

11. A method according to claim 1, the method comprising:
transmitting an awake indication to the data broker to indicate that the messaging client of the client device is configured to receive data from the data broker.

12. A method according to claim 11, wherein the awake indication comprises a keep alive request packet.

* * * * *